(12) United States Patent
Schiffers et al.

(10) Patent No.: US 11,052,591 B2
(45) Date of Patent: Jul. 6, 2021

(54) METHOD FOR OPERATING AN INJECTION MOULDING MACHINE

(71) Applicant: KraussMaffei Technologies GmbH, Munich (DE)

(72) Inventors: Reinhard Schiffers, Munich (DE); Stefan Kruppa, Munich (DE); Stefan Moser, Hallbergmoos (DE); Matthias Busl, Karlsfeld (DE); Johannes Wortberg, Mülheim a.d.R. (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 611 days.

(21) Appl. No.: 15/737,180

(22) PCT Filed: Jul. 19, 2016

(86) PCT No.: PCT/EP2016/067138
§ 371 (c)(1),
(2) Date: Dec. 15, 2017

(87) PCT Pub. No.: WO2017/013097
PCT Pub. Date: Jan. 26, 2017

(65) Prior Publication Data
US 2018/0169921 A1 Jun. 21, 2018

(30) Foreign Application Priority Data
Jul. 20, 2015 (DE) .......................... 102015111719.3

(51) Int. Cl.
*B29C 45/76* (2006.01)
*B29C 45/47* (2006.01)
(Continued)

(52) U.S. Cl.
CPC .............. *B29C 45/76* (2013.01); *B29C 45/47* (2013.01); *B29C 45/57* (2013.01); *B29C 45/581* (2013.01);
(Continued)

(58) Field of Classification Search
CPC .. B29C 2945/76006; B29C 2945/7602; B29C 2945/7604; B29C 2945/7605;
(Continued)

(56) References Cited

U.S. PATENT DOCUMENTS 4,349,324 A 9/1982 Neff et al.
4,425,044 A 1/1984 Kurtz et al.
(Continued)

FOREIGN PATENT DOCUMENTS

CN 101642951 A 10/2010
DE 30 21 978 9/1992
(Continued)

OTHER PUBLICATIONS

Chinese Search Report dated Aug. 16, 2019 with respect to counterpart Chinese patent application 2016800349861.
(Continued)

*Primary Examiner* — Chad G Erdman
(74) *Attorney, Agent, or Firm* — Henry M. Feiereisen LLC

(57) ABSTRACT

In a method for operating an injection moulding machine in the absence of a backflow barrier, plastic melt is injected by a plasticising device into a cavity in a screw antechamber of a plasticising screw adapted to rotate about a longitudinal axis and to move translationally by a drive unit during an injection phase and a holding-pressure phase. A rotational drive of the drive unit is controlled such that a speed of the plasticising screw causes overlay of a backflow of the plastic melt from the screw antechamber back into screw threads of (Continued)

the plasticising screw by an opposing delivery flow as a result of a rotation of the plasticising screw due to a translational injection movement of the plasticising screw. A differential flow is established from the backflow and the opposing delivery flow and influenced at least during the injection phase by influencing the speed of the plasticising screw.

21 Claims, 10 Drawing Sheets

(51) Int. Cl.
| | |
|---|---|
| *B29C 45/57* | (2006.01) |
| *B29C 45/58* | (2006.01) |
| *B29C 45/62* | (2006.01) |
| *B29C 45/77* | (2006.01) |
| *B29C 45/50* | (2006.01) |

(52) U.S. Cl.
CPC .......... *B29C 45/62* (2013.01); *B29C 45/7646* (2013.01); *B29C 45/77* (2013.01); *B29C 45/5092* (2013.01); *B29C 2945/7602* (2013.01); *B29C 2945/7604* (2013.01); *B29C 2945/7605* (2013.01); *B29C 2945/76006* (2013.01); *B29C 2945/7612* (2013.01); *B29C 2945/7619* (2013.01); *B29C 2945/76187* (2013.01); *B29C 2945/76197* (2013.01); *B29C 2945/76381* (2013.01); *B29C 2945/76384* (2013.01); *B29C 2945/76545* (2013.01); *B29C 2945/76605* (2013.01); *B29C 2945/76665* (2013.01); *B29C 2945/76859* (2013.01); *B29C 2945/76862* (2013.01); *B29C 2945/76933* (2013.01)

(58) Field of Classification Search
CPC .. B29C 2945/7612; B29C 2945/76187; B29C 2945/7619; B29C 2945/76197; B29C 2945/76381; B29C 2945/76384; B29C 2945/76545; B29C 2945/76605; B29C 2945/76665; B29C 2945/76859; B29C 2945/76862; B29C 2945/76933; B29C 45/47; B29C 45/5092; B29C 45/57; B29C 45/581; B29C 45/62; B29C 45/76; B29C 45/7646; B29C 45/77
See application file for complete search history.

(56) References Cited

U.S. PATENT DOCUMENTS

| | | | |
|---|---|---|---|
| 5,013,231 A | | 5/1991 | Fujita et al. |
| 5,130,076 A | | 7/1992 | Blatz et al. |
| 5,346,657 A | * | 9/1994 | Hara ................ B29C 45/76 264/40.1 |
| 5,540,495 A | | 7/1996 | Picket |
| 5,686,032 A | * | 11/1997 | Mizobe ............ B29C 45/14336 264/267 |
| 6,030,203 A | * | 2/2000 | Kuroda ................ B29C 45/54 425/561 |
| 6,206,559 B1 | | 3/2001 | Kinoshita et al. |
| 7,291,297 B2 | | 11/2007 | Weatherall et al. |
| 7,713,049 B2 | | 5/2010 | Maruyama et al. |
| 2004/0119204 A1 | | 6/2004 | Nishigaki |
| 2010/0273944 A1 | * | 10/2010 | Kobayashi ............ C08L 77/02 525/55 |
| 2015/0314505 A1 | * | 11/2015 | Kao ................ B29C 45/03 264/328.15 |
| 2016/0229101 A1 | | 8/2016 | Schiffers |
| 2016/0250791 A1 | | 9/2016 | Schiffers et al. |

FOREIGN PATENT DOCUMENTS

| | | |
|---|---|---|
| DE | 43 44 335 | 2/1996 |
| DE | 42 38 277 | 5/1997 |
| DE | 102005007747 | 5/2006 |
| DE | 698 37 644 | 1/2008 |
| DE | 102006033507 | 1/2008 |
| DE | 102 43 683 | 5/2008 |
| EP | 1 162 053 | 3/2004 |
| JP | 07-290555 | 11/1995 |
| JP | H 11-207792 | 8/1999 |
| JP | 2006-142739 | 6/2006 |

OTHER PUBLICATIONS

Translation of Chinese Search Report dated Aug. 16, 2019 with respect to counterpart Chinese patent application 2016800349861.
International Search Report issued by the European Patent Office in international Application PCT/EP2016/067138 dated Sep. 30, 2016.

\* cited by examiner

METHOD FOR OPERATING AN INJECTION MOULDING MACHINE

CROSS-REFERENCES TO RELATED APPLICATIONS

This application is the U.S. National Stage of International Application No. PCT/EP2016/067138, filed Jul. 19, 2016, which designated the United States and has been published as International Publication No. WO 2017/013097 and which claims the priority of German Patent Application, Serial No. 10 2015 111 719.3, filed Jul. 20, 2015, pursuant to 35 U.S.C. 119(a)-(d).

BACKGROUND OF THE INVENTION

The invention relates to a method for operating an injection moulding machine.

The task involving an injection moulding machine comprises the discontinuous manufacture of moulded parts from preferably macro-molecular moulding compounds, wherein the original moulding is carried out under pressure [Michaeli, W.: Introduction into the processing of plastics, Hanser, 2010]. To this end a solid input material (granulate, powder, etc.) is changed into a molten form in a dosing phase. The raw material is transported by means of a plasticising screw over the screw threads and compressed, causing it to melt by introducing frictional heat. During this process the melt being created collects in a screw antechamber and, at the screw tip, passes through a normally existing backflow barrier, a kind of mechanical valve shaped as a ring or ball which in the opened state allows the melt to flow in conveying direction.

In a subsequent mould-filling phase (injection phase and holding-pressure phase) the mould of a tool cavity is then filled. During this process the plasticising screw is moved translationally at a feed speed $v_{inj}$, wherein it functions as a piston which injects the melt via a runner channel into the cavity. In the course of the injection phase the backflow barrier closes due to the resulting melt pressure $p_s$ and/or due to friction on the cylinder wall. The closure time as such is difficult to determine and often remains undefined because it is depending on many factors. Admittedly a reproducible closure time essentially contributes to an accurately repeatable volumetric filling of the cavity. If the backflow barrier closes at a later time, more melt flows back into the screw threads.

The U.S. Pat. No. 7,713,049 B2 has disclosed a method, which makes use of the backflow of the melt into the screw threads. Due to flanks of the screw a torque impacts on the screw which can be easily measured and which supplies a clue as to the closure time of a backflow barrier. Generally speaking the screw is held rotationally firmly in position during the translational injection movement. With hydraulically driven injection moulding machines this is effected by enclosing the oil flow via a valve on the hydraulic motor, and with electro-mechanically driven injection moulding machines this is done by preventing the plasticising drive from rotating by means of position control. With Duroplast screws or PVC screws there is no need for a backflow barrier because the disadvantages outweigh the benefit. A movable component in the screw antechamber leads to dead spots, where melt accumulates and degrades and for example leads to black spots in glass-clear materials. In the case of non-thermoplastics the material quickly cross-links under certain circumstances so that the plasticising device needs to be quickly dismantled. In this case also a backflow barrier is not suitable making a backflow of the melt into the screw threads unavoidable.

The DE 10 2005 007 747 B3 has disclosed a method for electro-mechanically driven injection moulding machines with backflow barrier, where both drive motors are operated in parallel in order to achieve a higher injection speed and at the same time shorten the plasticising time. Reference is made to the usual design of a backflow barrier in an injection moulding machine, which excludes a rotation of the plasticising drive during the entire injection phase, since this can then no longer close correctly. Not until a certain injection pressure has built up in front of the backflow barrier shall rotation commence in order to refill the partially filled screw threads.

The DE 4 344 335 C2 describes the constructional necessity of rotating the injection and plasticising drives at the same speed, in order to move the plasticising screw without rotation. Due to the coupling of both drives by means of a hollow shaft the plasticising screw moves in axial direction when the dosing drive holds the spindle nut or even moves it in the opposite direction, whilst the injection drive rotates. During injection the dosing motor holds the drive shaft in a non-rotating state and the injection motor initiates the axial move of the plasticising screw via the spindle nut. This arrangement has the disadvantage that operation of the dosing motor is required in all operating modes of the injection motor.

The objective of the EP 1 162 053 B1 for such a drive concept is to enhance the injection performance by moving both drives or to reduce the layout of the motors for the same injection performance. To this end a detachable coupling device is provided between the shafts of the two motors, which makes it possible to perform rotation and movement of the plasticising screw independently of each other. For the injection movement both motors can e.g. be coupled so that the power of both motors is available in the injection phase.

The generic U.S. Pat. No. 7,291,297 B2 has disclosed a method for injection moulding machines with backflow barrier, in which both the injection drive and the dosing drive are operated in parallel. The method describes an injection moulding cycle, in which both during the axial injection movement of the plasticising screw and in the remaining cycle the dosing drive rotates the plasticising screw in parallel at a variable speed. The method provides for the plasticising screw to rotate throughout the entire cycle, if possible. In the dosing phase this has the advantage that tear moments for the starting move are reduced, as the plasticising screw is already rotationally moving. Material is being dispensed as early as during the injection phase, which again shortens the plasticising time because material is being continuously dispensed. The melt volume in the screw antechamber to be injected remains however always separated from the dosing volume during the injection phase and the holding-pressure phase due to the backflow barrier. This means that as regards mould-filling consistency the disclosed method is dependent on the closing behaviour of the backflow barrier employed. This is felt to be disadvantageous because in particular a closure time of the backflow barrier, which cannot be accurately determined, may have a major influence on volumetrically correct mould-filling.

The DE 3 021 978 C2 describes a method for controlling an injection moulding machine with a hydraulically operated injection piston in programmed injection phases and holding-pressure phases. It is stated that prior to reaching a sealing point a switch-over is made from the holding-pressure phase to the solidification phase, in that the actual value of the hydraulic pressure or of the pressure in the injection piston antechamber existing at the time of the switch-over is used as the initial set value for the hydraulic pressure control or for the injection piston antechamber pressure control of the solidification phase. A backflow barrier prevents a flow-back of plastic melt into the screw threads.

The DE 4 238 277 C2 relates to a multi-zone screw for the injection moulding of plastic-based moulding compounds with a screw core and a screw web helically extending thereon and a constant screw diameter, wherein the screw core comprises longitudinal sections of sometimes constant and sometimes changing diameter, so that the total length of the plasticising screw comprises a number of zones of different screw web heights.

The DE 10 2006 033 507 A1 describes a plasticising device for plastics, in particular a multi-zone screw without backflow barrier with a conically tapering screw core. In the processing of relatively low-viscosity products and given that especially long flow paths exist in the moulding tool, there may well be a tendency for the melt to flow back into the screw threads in an undesirable and undefined manner, which may lead to a degrading of the quality of the moulded part or to rendering the same unusable, and to an adverse deterioration of the injection moulding machine, for example due to a blockage in the runner channel. In particular if the melt is subjected to strong compression and at the same time to an insufficient take-off of material at the tool, a backlog is created at the exit point of the material from the plasticising screw. Admittedly the problem could be more or less successfully managed by fitting a backflow barrier at the front end of the plasticising screw wherein the backflow barrier, during plasticising, moves forward, allowing the melt to pass through, whilst during injection it is pushed backwards thereby blocking the screw antechamber.

The commonly known backflow barriers are expensive components which complicate the plasticising device, make it more susceptible to repairs and make it more expensive to a not insignificant extent. A backflow barrier as used in the art has disadvantages which will now be discussed in detail below.

The backflow barrier is a mechanical component. As such it is prone to wear and responsible for process fluctuations due to an irregular closing action. Over time, geometry and dimensions change both in length and as regards inner and outer diameters, as a result of which the closure time varies. In most injection moulding processes the switch-over from the injection phase to the holding-pressure phase takes place at a fixed position, which for a backflow barrier geometry leads to different filling volumes in the cavity. Accordingly set-up parameters have to be tracked. Backflow barriers also represent a flow obstruction. When used, there is a chance of "dead corners" being created, which can lead to dwell time differences of the melt and thus to thermal damage of the material. Moreover backflow barriers increase the flow resistance, cause a greater shearing and are therefore in certain circumstances responsible for material damage. These negative influences become particularly obvious during injection moulding of thermally sensitive thermoplastics such as PVC and duroplast materials. Processing of these materials is performed by often using screws without backflow barriers, and a certain undefined and undesirable backflow of the melt is accepted.

Further, the known three-zone plasticising screws lack the ability of being thermostatically controlled along their length in a way which is sufficient for the processing of sensitive substances with respect to the processing temperature. Plasticising screws can normally be thermostatically controlled by means of heating elements attached to the plasticising cylinder. At the beginning of a shot the entire plasticising screw is, as a rule, brought up to the desired melt temperature of the plastic material to be processed. Thereafter, however, no additional heating is essentially necessary, because the temperature is maintained by friction and dissipation. The plasticising screw, by itself, supplies approx. 70% of the required heat (friction, shear rotation, intrinsic rotation). A disadvantage of the heat created in this way is however that this is uncontrollable heat. If the achievable temperature constancy of the thermoplastic material lies outside a relatively narrow tolerance during processing of sensitive materials, this leads to an insufficiently flowable melt, i.e. a melt with an excessively high viscosity being injected at temperatures which are too low, leading to the cavity not being completely filled.

Process fluctuations develop in particular, when molten plastic material with varying melt quality is prepared. The melt quality is primarily determined by the raw material used (MFI=melt flow index), the proportion of the recycled material, the degree of drying, etc.), the processing temperature and the injection pressure. When there is a fluctuation, the process experiences a change in injection pressure demand, which is required for filling the cavity or cavities of a tool correctly with melt via the runner channel or the hot channel. This results in a change in flow behaviour and thus often in an irregular closing action of the backflow barrier, which means that different closure points of the backflow barrier occur, which in turn results in a change in the volume filled into the cavity. It also leads to a change in the shot volume if after dosing, following compression relief, plastic melt flows from a metering zone of the plasticising screw into the screw antechamber. Depending on the system this leads to stronger fluctuations of the shot behaviour of the backflow barrier, if the mould is filled at a low injection speed because the barrier ring or the central sphere of the backflow barrier are moved more irregularly. Without the use of the backflow barrier material flows in an undefined and undesirable manner back into the screw threads. The result is again a reduced shot volume and insufficient or irregular mould filling.

SUMMARY OF THE INVENTION

It is therefore the requirement of the invention to propose a method for operating an injection moulding machine, which makes it possible to keep the shot volume constant to a greater extent across a plurality of injection cycles. A further requirement consists in proposing a method for operating an injection moulding machine which for an increased consistency of the injection moulding process across a plurality of injection moulding cycles, in particular for an improved consistency of volumetric mould filling, manages without a backflow barrier.

These requirements are met by a method as set forth hereinafter. Advantageous embodiments are cited in the sub-claims.

A method according to the invention for operating an injection moulding machine, which comprises at least one plasticising device with at least one plasticising screw, which can be driven about a screw longitudinal axis in both a rotational and a translational manner, wherein by means of the plasticising device plastic melt is provided for injecting into a mould cavity in a screw antechamber, is characterised in that in order to inject the plastic melt into the mould cavity, i.e. at least during an injection phase and during a holding-pressure phase of an injection moulding cycle, the plasticising screw is actively driven both translationally and rotationally by means of at least one drive unit, wherein the rotational drive of the plasticising screw is effected at a speed $n_{scr}$ such that a backflow $\dot{m}_{druck}$ of the melt from the screw antechamber back into the screw threads of the plasticising screw is overlaid by a defined opposing delivery flow $\dot{m}_{schlepp}$ caused by the rotation of the plasticising screw due to a translational injection and/or holding-pressure movement of the plasticising screw, wherein a differential flow $\dot{m}_A$ is created from the backflow $\dot{m}_{druck}$ and the opposing delivery flow $\dot{m}_{schlepp}$ and the differential flow $\dot{m}_A$ is influenced at least during the injection phase by influencing the speed $n_{scr}$ of the plasticising screw. With this arrangement the differential flow $\dot{m}_A$ may be held constant via, for example, the injection time or via an injection stroke or may follow a predetermined, in particular desired course, e.g. in dependence of the course of the injection pressure during a cycle. The method according to the invention is carried out without the use of a backflow barrier.

In essence the invention is thus based on the knowledge that due to the rotation of the plasticising screw, at least during the injection phase, a degree of freedom is created, by means of which process variables of an injection cycle can be influenced. The essential point is that a backflow $\dot{m}_{druck}$ is overlaid with an opposing delivery flow $\dot{m}_{schlepp}$ by a rotation of the plasticising screw at least during the injection phase, so that a differential flow $\dot{m}_A$ is created, the absolute size of which is of secondary importance, but which can be influenced via the drive of the plasticising screw with a speed $n_{scr}$. This differential flow $\dot{m}_A$ can, during the injection phase, either be held constant or can follow a predetermined course by adjusting the speed $n_{scr}$.

Due to this knowledge it is possible, to omit a backflow barrier with its disadvantages as regards determination of the closure time of the backflow barrier and also its disadvantageous wear tendency. In terms of the invention by contrast, rotation of the plasticising screw now offers the possibility of actively influencing a process sequence of an injection moulding cycle. Backflow barriers, as used in the state of the art, are by contrast passive components, which cannot be influenced from the outside, in particular as regards their closing behaviour. Even reliable determination of the closure time of a backflow barrier is difficult in the present state of the art. These difficulties are avoided by the invention in that a backflow barrier is totally omitted.

In a preferred embodiment the differential flow $\dot{m}_A$ is greater than zero during the injection phase, which means that additional melt is fed into the screw antechamber due to the rotation of the plasticising screw during the injection phase and/or the holding-pressure phase. This is effected at the melt pressure $p_s$ momentarily existing in the screw antechamber. In this embodiment the drive power of the drive unit can be utilised for the rotational drive of the plasticising screw in addition to the drive power of the drive unit for the translational drive of the plasticising screw.

Alternatively thereto the differential flow $\dot{m}_A$ may be zero, which is equivalent to the fact that the backflow $\dot{m}_{druck}$ in relation to the opposing delivery flow $\dot{m}_{schlepp}$ is the same size.

In this embodiment the plasticising screw, as regards its speed $n_{scr}$, is operated in a controlled or regulated manner such that a differential flow $\dot{m}_A$ of size 0 is created. This corresponds to an ideally functioning backflow barrier without leakage losses. A process control of this kind is recommended in particular then, when an ideally closing backflow barrier shall be simulated by means of the method according to the invention.

Further alternatively, the differential flow may be $\dot{m}_A<0$, which is the equivalent to the fact that the backflow barrier $\dot{m}_{druck}$ is larger than the opposing delivery flow $\dot{m}_{schlepp}$.

In this embodiment according to the invention a differential flow $\dot{m}_A$ remains, which is directed back into the screw threads. Such a process control has the advantage that the rotational drive of the plasticising screw requires less drive power, because the screw must be driven at a lesser speed $n_{scr}$. Furthermore this has the advantage that during the injection phase and/or during the holding-pressure phase the material stress in the plasticising zone of the plasticising screw is less. Despite all this such a process control can be used to execute the invention to advantage because the most important point is that the differential flow $\dot{m}_A$ is set in a defined manner, in order to avoid unclear process sequences as caused for example by a backflow barrier.

Whether the differential flow $\dot{m}_A$ is larger or smaller than zero or equal to zero, can be adjusted and set in an advantageous manner in dependence of the material or the components or similar.

In a convenient design the size of the opposing delivery flow $\dot{m}_{schlepp}$ is influenced in conveying direction via the speed $n_{scr}$ of the plasticising screw.

Preferably the speed $n_{scr}$ is determined and controlled and/or regulated in dependence of at least one melt parameter or the speed $n_{scr}$ is adaptively adjusted to the at least one melt parameter during the injection phase and/or during the holding-pressure phase of a single cycle.

In this preferred embodiment the new degree of freedom gained by the invention is fully demonstrated. The speed $n_{scr}$ can be adjusted in dependence of the melt parameters individually for each cycle and/or for each component.

Suitable melt parameters may be, for example, the melt pressure $p_S$ measured in the screw antechamber or at the piston-side end of the plasticising screw, the melt viscosity $v_S$ or the melt temperature $T_S$. These are all melt parameters which can be easily measured on the injection moulding machine or calculated from measurable variables, which suffer from few inaccuracies and contribute to influencing the speed $n_{scr}$ and thus the differential flow $\dot{m}_A$.

The backflow $\dot{m}_{druck}$, the opposing delivery flow $\dot{m}_{schlepp}$ and the resulting differential flow $\dot{m}_A$ may be mass flows or volume flows of the melt.

Preferably the translational stroke movement of the plasticising screw can be influenced at least during the injection phase in dependence of the absolute size of the differential flow $\dot{m}_A$ such that the translational stroke path of the plasticising screw is enlarged in comparison to the theoretical zero position, if the differential flow is $\dot{m}_A<0$ or the stroke path of the plasticising screw is shortened relative to a theoretical zero position if the differential flow is $\dot{m}_A>0$.

These measures make it possible to increase the variability of a certain screw/cylinder combination as regards the shot weight, since both smaller and larger shot weights than the ideal shot weights of this screw/cylinder combination can be achieved.

In a further preferred embodiment the method according to the invention is performed during the entire injection phase and/or during the entire holding-pressure phase.

It has become evident that in particular during the entire holding-pressure phase the method according to the invention is of particular advantage. In particular the necessary holding pressure can be, at least partially, supportingly generated by a rotation of the plasticising screw, because a normally necessary holding pressure is often smaller than an injection pressure. With the method according to the invention these pressure levels for the holding pressure can be created by, for example, a combination of rotation and translation of the plasticising screw. An annoying backflow barrier from the state of the art does not exist in the inventive method.

In particular the method according to the invention is suitable for softening the transition from the injection into the holding-pressure phase, which is equivalent to a transition from a high injection pressure to a low holding pressure, in that an existing mass (melt) pressure $p_s$ at the time of transition from the injection to the holding-pressure phase is reduced by way of a short-term reduction in rotational movement of the plasticising screw. By selectively influencing the rotational movement of the plasticising screw hard pressure transitions can be softened or brought closer to a predetermined course. The flow front speed of the melt is thus held more constant, which has positive implications for the quality of the moulded parts and is desirable for the operators.

According to a further embodiment, in the interest of influencing the differential flow $\dot{m}_\Delta$, in particular in order to keep it constant during an injection and/or holding-pressure phase in one and the same injection cycle, the speed $n_{scr}$ of the plasticising screw is varied in dependence of the feed speed $v_{inj}$ and/or the melt pressure $p_s$.

Due to this measure it is possible to in particular respond to pressure fluctuations in the screw antechamber within an injection cycle.

Preferably the injection moulding machine is an electrically or hydraulically driven injection moulding machine or a hybrid machine.

Preferably the speed $n_{scr}$ is predefined proportionally to the feed speed $v_{inj}$ in translational direction and/or proportionally to the melt pressure $p_S$, in particular measured in the screw antechamber or behind the screw shaft.

In a further embodiment the speed $n_{scr}$ can be predefined as an adjustable profile.

Conveniently injection of the melt can be regulated via the translational feed speed $v_{inj}$ of the plasticising screw along its translational movement path.

Preferably during the holding-pressure phase, a holding pressure of the melt is generated at least partially via the rotation of the plasticising screw, in particular via a supporting rotation in addition to the translational, i.e. axial movement, of the plasticising screw.

This has the advantage that it is possible to avoid an up-to-now commonly used switch-over from speed control during the injection phase to pressure control during the holding-pressure phase for example, as well as the respective inaccuracies during switch-over. Using the method according to the invention it is possible to achieve a soft transition from the injection phase to the holding-pressure phase and, in the case of applying the holding pressure by varying the rotation of the plasticising screw, to lower the melt pressure to the required value of the holding-pressure.

It is also possible to save on time required for the holding-pressure phase because plasticising takes place as early as during the holding-pressure phase.

It may be advantageous to use the speed $n_{scr}$ for influencing, in particular increasing the output factor AF and thus a shot weight for a predefined screw diameter D.

In this embodiment it is particularly easy to adjust the output factor AF by simply adjusting or influencing the speed $n_{scr}$.

Furthermore it may be advantageous to control or regulate the speed $n_{scr}$ of the plasticising screw in a component-specific manner in order to adjust an optimal flow front speed of the melt within the cavity.

By means of the inventive method using this embodiment it is thus possible, merely by influencing the speed $n_{scr}$, to adjust and thus optimise a flow front speed of the melt in the tool.

In a further preferred embodiment of the inventive method the speed $n_{scr}$ is adjusted, at least during a part of the injection phase, proportionally to the melt pressure $p_s$ with a factor $k_2=f_p$, wherein:

$$n_{scr}=f_p*p_s,$$

wherein the melt pressure $p_s$ is measured and $k_2=f_p$ is a process-specifically determined proportionality factor. This embodiment allows a pressure-controlled adjustment of the speed $n_{scr}$ in dependence of the melt pressure $p_s$. The backflow $\dot{m}_{druck}$ of melt back into the screw threads is among others dependent on the melt pressure $p_s$, so that using this embodiment of the method according to the invention, an adequate opposing delivery flow $\dot{m}_{schlepp}$ can counteract the pressure-dependent backflow $\dot{m}_{druck}$ by a pressure-dependent control of the speed $n_{scr}$.

In a further preferred embodiment of the method according to the invention the speed $n_{scr}$, at least during a part of the injection phase, is adjusted proportionally to the feed speed $v_{inj}$ of the plasticising screw using a factor $k_1=f_v$, wherein:

$$n_{scr}=f_v*v_{inj},$$

wherein the feed speed $v_{inj}$ is measured or determined from process data and the proportionality factor $k_1=f_v$ is a process-specifically determined proportionality factor.

It has also become evident that a proportional adjustment of the speed $n_{scr}$ to suit the feed speed $v_{inj}$ is a good possibility to set the opposing delivery flow $\dot{m}_{schlepp}$, because the backflow $\dot{m}_{druck}$ changes in dependence of the feed speed $v_{inj}$.

With a further embodiment at least during a part of the holding-pressure phase the speed $n_{scr}$ of the plasticising screw is set proportionally to the melt pressure $p_s$ in the holding-pressure phase with the factor $k_3=f_{p\_pck}$, wherein:

$$n_{scr}=f_{p\_pck}*p_{s\_pck},$$

wherein the melt pressure $p_{s\_pck}$ is measured in the holding-pressure phase and $k_3=f_{p\_pck}$ is a process-specifically determined proportionality factor. The holding-pressure phase is usually pressure controlled as regards the screw feed. Therefore a certain melt pressure $p_s$ or a certain melt pressure profile are present during the holding-pressure phase. It was found to be positive to set the speed $n_{scr}$ proportionally to the melt pressure $p_s$ present in the holding-pressure phase.

A particularly preferred embodiment of the method according to the invention is characterised in that the speed $n_{scr}$, in the injection phase, in particular in the initial period of the injection phase, is determined and set using the equation $n_{scr}=f_v*v_{inj}$, as long as a product from the proportionality factor $f_v$ and the feed speed $v_{inj}$ is larger than a product from the proportionality factor $f_p$ and the melt pressure $p_s$. Therefore in the initial period the speed $n_{scr}$ of the plasticising screw is initially determined and set in a speed-controlled manner, wherein after exceeding a certain switch-over point a transition occurs to a pressure-controlled determination and setting of the speed $n_{scr}$. By means of this procedure inertia effects and inaccuracies present in an initial period can be advantageously overcome based on a still relatively low melt pressure level due to the initially speed-controlled determination and setting of the speed $n_{scr}$.

Furthermore it is preferred to determine the proportionality factors $f_v$ and/or $f_p$ and/or $f_{p\_pck}$ process-specifically in a learning phase. With proportionality factors determined in this way the method according to the invention can then be performed in a production phase, wherein it has become evident that the degrees of form-filling and/or component weights can be reproduced many times over and can be held constant to a high degree from cycle to cycle.

In the art the injection procedure in the injection moulding process is described as a translational movement of the plasticising screw, wherein the screw is held in position in a rotatory manner. The method according to the invention now preferably provides, in the entire phase of the injection movement now simultaneously to the forward movement, a rotational movement of the plasticising screws. The consequence of this is that plastic present in the plasticising screw is conveyed across the flanks. By means of this conveying of molten plastic within the plasticising screw it is possible, in particular in dependence of a speed $n_{scr}$, to prevent a backflow of material into the screw threads or to alter it in a defined manner or to actively, in a defined manner, convey additional material in the injection phase into the screw antechamber. Depending on how the speed $n_{scr}$ in the injection phase is varied and adjusted, the form filling can thus be influenced.

By rotating the plasticising screw during the injection and holding-pressure phases a backflow barrier can be omitted, because the plasticising of material in the screw threads causes a build-up of corresponding counter-pressure. This prevents a backflow of material in the screw threads and a decrease in the output factor AF. The output factor AF takes into account the difference between melt and solids density as well as the closing behaviour of the backflow barrier. The shot weight is thus calculated according to the formula:

Output factor×stroke volume=shot weight.

It is even possible to raise the output factor AF by increasing the conveying performance if the plasticising screw is rotated at a corresponding speed $n_{scr}$ user during the form-filling operation. In addition the effects from a possibly irregularly closing backflow barrier disappear. Process consistency increases.

The method is in particular recommended for injection moulding processes, in which a backflow barrier is also suitable for processes operated exclusively with backflow barriers up to now. It is suitable for hydraulically driven as well as for electrical injection units. It is convenient to specify the speed $n_{scr}$ for example proportionally to the feed speed $v_{inj}$ and/or to the melt pressure $p_s$ (measured in the screw antechamber or behind the screw shaft) or as an adjustable profile.

By varying the rotational speed, i.e. the speed $n_{scr}$ of the plasticising screw, a further degree of freedom is created according to the invention, so that it is even possible to omit the classic division into injection and holding-pressure phase. Up to now there has been a transition from control of the feed in the injection phase to control of the pressure in the holding-pressure phase (v/p transition).

Thus it may be that there is again uncertainty as to the closing state of the backflow barrier at the beginning of the holding-pressure phase in the art.

By means of the method according to the invention this is prevented in that during the holding-pressure phase, due to the rotation of the plasticising screw as well as in the injection phase the differential flow $\dot{m}_k$, can be influenced in a predictable manner, in particular is controlled to zero. Thus a defined determination of the machine state/the method state is constantly possible.

The advantages of the method according to the invention using a variable speed $n_{scr}$ during the translational screw movement in the form-filling phase, are seen in that a backflow barrier or a shutoff valve between screw tip and screw antechamber can be altogether omitted, and in that thereby the screw head can be designed in a conveying-efficient manner so that longer dwell times of melt content or thermal damage to the melt can be reduced by an increased shearing in the area of a backflow barrier or a shut-off valve, a further control variable can be made available in the area of process control, at which, by varying the speed $n_{scr}$, the output factor AF and thus the respective shot weight can be increased for the same screw diameter. Also the flow front speed of the melt in the cavity can be varied.

Depending on the process used fluctuations in the process are reduced due to elimination of the closing operation of the backflow barrier as a process disturbance. Wear and thus maintenance expenditure are also reduced because no moving parts are present which need to be replaced. Due to a higher output factor AF a smaller plasticising unit can be used/production of a moulded part is at last possible (cylinder diameter limitation for duroplast machines) or a plasticising screw with a lower L/D ratio can be used. By rotating the plasticising screw as specified in the invention, at least during part of the form-filling phase, the plasticising time as such is reduced because plastic melt is dispensed as early as in the injection phase and/or the holding-pressure phase and in the feed zone the screw threads are better filled with granulate during the injection movement.

Moreover a corrected flow index of the melt can be measured, which can be used for the precise valuation of the dynamic shear viscosity of the plastic melt. Since the viscosity has a major influence on the compression of the melt including the form-filling itself, there is the possibility, via an adaptive adjustment of the speed $n_{scr}$, of positively impacting process and product quality.

The method according to the invention is designed for the use of electro-mechanical and hydro-mechanical injection moulding machines of all sizes. Thus it can be used in all new machines and as regards retrofitting.

BRIEF DESCRIPTION OF THE DRAWING

The method according to the invention and a screw head suitable for performing the method according to the invention will now be explained in detail with reference to the drawing, in which.

DETAILED DESCRIPTION OF PREFERRED EMBODIMENTS

Figure 1:
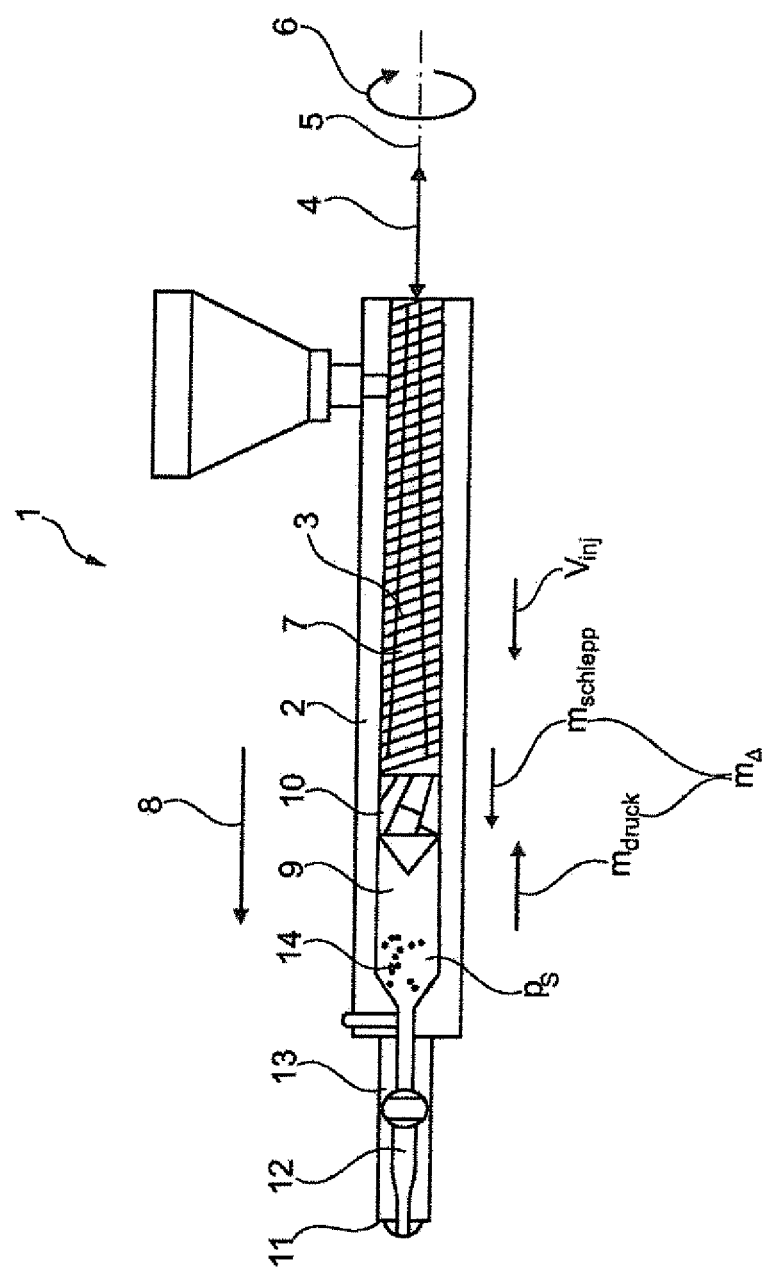
FIG. 1: shows a strongly schematically drawn injection moulding machine in an operating state shortly before an injection phase.

An injection moulding machine 1, which is suitable for being operated by the method according to the invention comprises a plasticising cylinder 2, in which a plasticising screw 3 is arranged in the known manner. The plasticising screw is translationally movable by means of a first drive mechanism (not shown) at a feed rate $v_{inj}$ in a stroke direction 4. A second drive mechanism (not shown) is provided, by means of which the plasticising screw 3 is actively drivable about its longitudinal axis 5 in a rotation direction 6 at a speed $n_{scr}$. Conveying of the plastic material within the screw threads 7 takes place about its longitudinal axis 5 in rotation direction 6 by means of a rotational drive in a conveying direction 8 in direction of a screw antechamber 9. At an end of the plasticising screw 3 which faces the screw antechamber 9, the plasticising screw 3 has a screw head 10. A backflow barrier is not provided. At the end the plasticising cylinder 2 comprises an injection nozzle 11, which is connected to the antechamber 9 via a channel 12. A valve 13, in particular a closing nozzle, may be arranged in the channel 12, by means of which a flow path through the channel 12 can be released or blocked. At the start of and during the injection phase melt 14 is present under melt pressure $p_S$ in the screw antechamber 9. As the injection phase starts, the plasticising screw 3, according to the method of the invention, is moved by means of the first drive mechanism in stroke direction 4 towards the injection nozzle 11, which means that the melt is injected via the injection nozzle 11 into a tool cavity (not shown). Due to the melt pressure $p_S$ melt 14 is pressed during the injection phase against the conveying direction 8 back into the screw threads 7 of the plasticising screw 3. Such a backflow of melt 14 is denoted with $\dot{m}_{druck}$. With the method according to the invention, the plasticising screw 3, in addition to the translational movement of the plasticising screw 3 in stroke direction 4 towards the injection nozzle 11, is rotationally driven in rotation direction 6. This produces an opposing delivery flow of plasticised or molten plastic material towards the screw antechamber 9. This opposing delivery flow is directed against the backflow $\dot{m}_{druck}$ and thus overlays it. In the following the opposing delivery flow is denoted with $\dot{m}_{schlepp}$. The essential point is that with the invention, due to the defined rotation of the plasticising screw 3 in rotation direction 6 without an intermediate backflow barrier, an opposing delivery flow $\dot{m}_{schlepp}$ can be generated by the plasticising screw 3 in the screw antechamber 9, which acts against the backflow $\dot{m}_{druck}$. Depending on the speed $n_{scr}$ of the plasticising screw 3 the opposing delivery flow $\dot{m}_{schlepp}$ can be influenced with regard to its size. A total of the mutually opposing flows $\dot{m}_{druck}$ (backflow) and $\dot{m}_{schlepp}$ (opposing delivery flow) results in a differential flow $\dot{m}_A$ of melt 14 into the screw antechamber 9 or out of the screw antechamber 9 back into the screw threads 7. As part of the invention it was recognised that the opposing delivery flow $\dot{m}_{schlepp}$ can be adjusted in a predictable manner particularly easily by control and/or regulating measures so that in consequence the differential flow $\dot{m}_A$ can also be influenced well, which opens up the possibility of automatic process control.

As the injection phase starts, the speed $n_{scr}$ is pre-controlled in dependence of the feed speed $v_{inj}$ with $n_{scr}=f_v*v_{inj}$ using a factor $k_1=f_v$, until the plasticising screw makes contact with the melt. When the plasticising screw makes contact with the melt and compresses the same, the melt pressure $p_s$ rises.

When a product from the melt pressure $p_s$ and a proportionality factor $k_2=f_p$ is greater than a product from the feed speed $v_{inj}$ and the factor $k_1=f_v$, the speed $n_{scr}$ is determined and adjusted pressure-controlled using the equation $n_{scr}=p_s*f_p$.

In the holding-pressure phase the speed $n_{scr}$ is adjusted pressure-controlled via $n_{scr}=k_3*p_{s\_pck}$, wherein $k_3=f_{p\_pck}$ is a proportionality factor.

By influencing the differential flow $\dot{m}_A$ in this way, it is possible, to influence the injection moulding process in a liable and reproducible manner, which makes it possible in a particularly easy way to sustain correct and uniform mould-filling of the mould cavity (not shown) within narrow boundaries over a plurality of injection moulding cycles.

Figure 2:
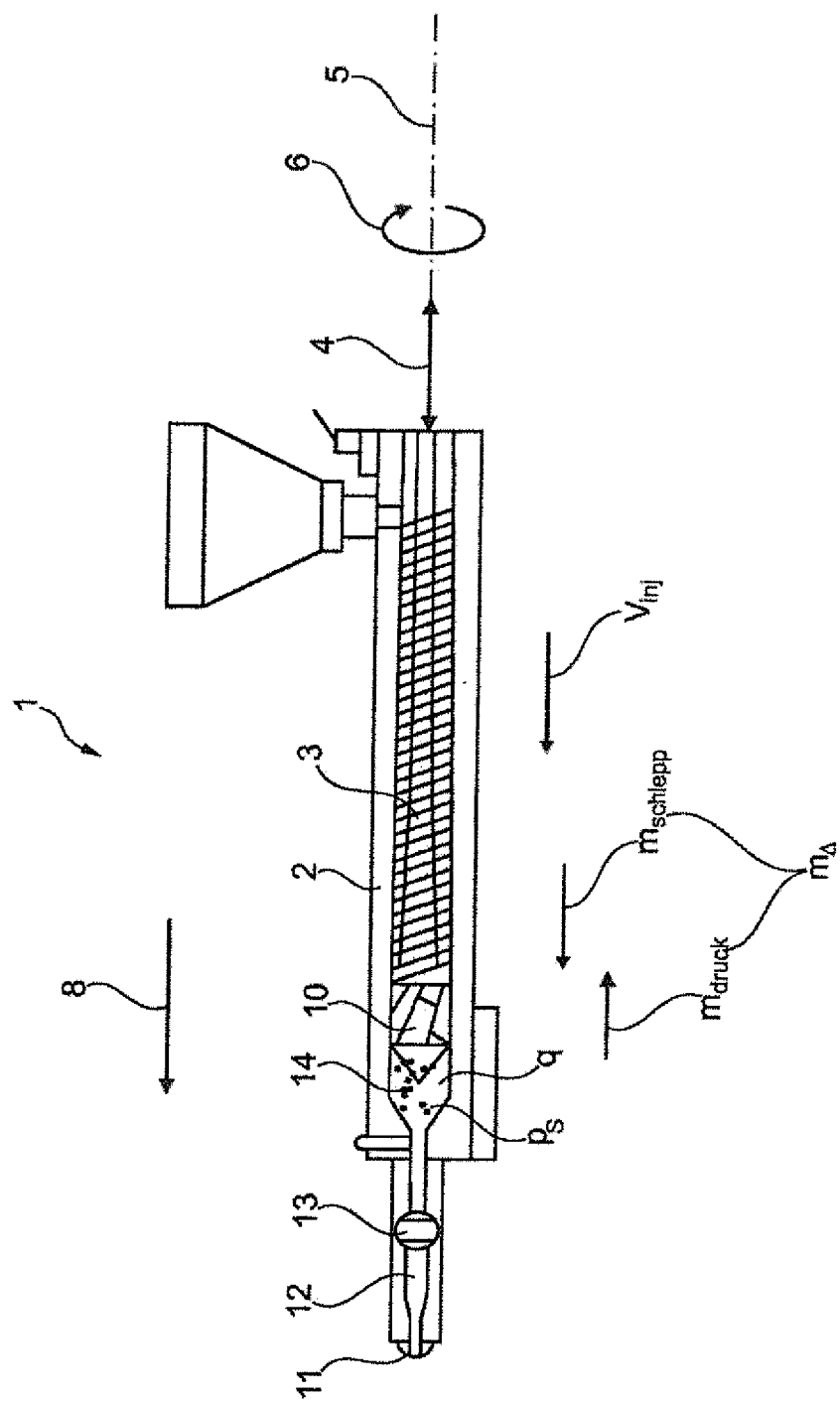
FIG. 2: shows the injection moulding machine of FIG. 1 during the injection phase.

FIG. 2 shows the schematically shown injection moulding machine 1 as per FIG. 1 during the injection phase or at the start of the holding-pressure phase. Compared to the view in FIG. 1 the plasticising screw 3 is arranged in a state as shown in FIG. 2 moved a bit closer in direction towards the injection nozzle 11. In a particularly preferred embodiment the melt pressure $p_S$ required for the holding-pressure phase at the beginning thereof, which is less than the injection pressure required for injection of the melt 14, is generated not only by an axial movement of the plasticising screw 3 in stroke direction 4 towards the nozzle 11, but by a combination of axial movement and rotation of the plasticising screw 3 in rotation direction 6. In this context it is desirable to keep the rotation of the plasticising screw 3 in rotation direction 6 as small as possible, in order to prevent possible damage to the material if this is particularly sensitive. It is therefore obvious to generate the holding pressure via the axial movement of the plasticising screw and to perform rotation of the plasticising screw at merely such an intensity that a backflow of the melt is prevented or reduced.

The resulting opposing delivery flow $\dot{m}_{schlepp}$ is calculated such that the holding pressure in the melt 14 is sufficient. Even so the holding pressure can, of course, also be applied by way of a combination of a translational movement of the plasticising screw 3 in direction of the nozzle 11 and by a rotational movement of the plasticising screw 3 in rotation direction 6. Conveniently, in order to build up holding pressure from at least partially the rotational movement of the plasticising screw 3 in rotation direction 6, the opposing delivery flow $\dot{m}_{schlepp}$ is adjusted via the speed $n_{scr}$ such that this is greater than a backflow $\dot{m}_{druck}$, which due to the melt pressure $p_S$ would occur back into the screw threads 7, so that a differential flow $\dot{m}_A$ occurs from the screw threads 7 into the screw antechamber 9. In such an operational state a differential flow $\dot{m}_A$ is greater than zero.

Figure 3:
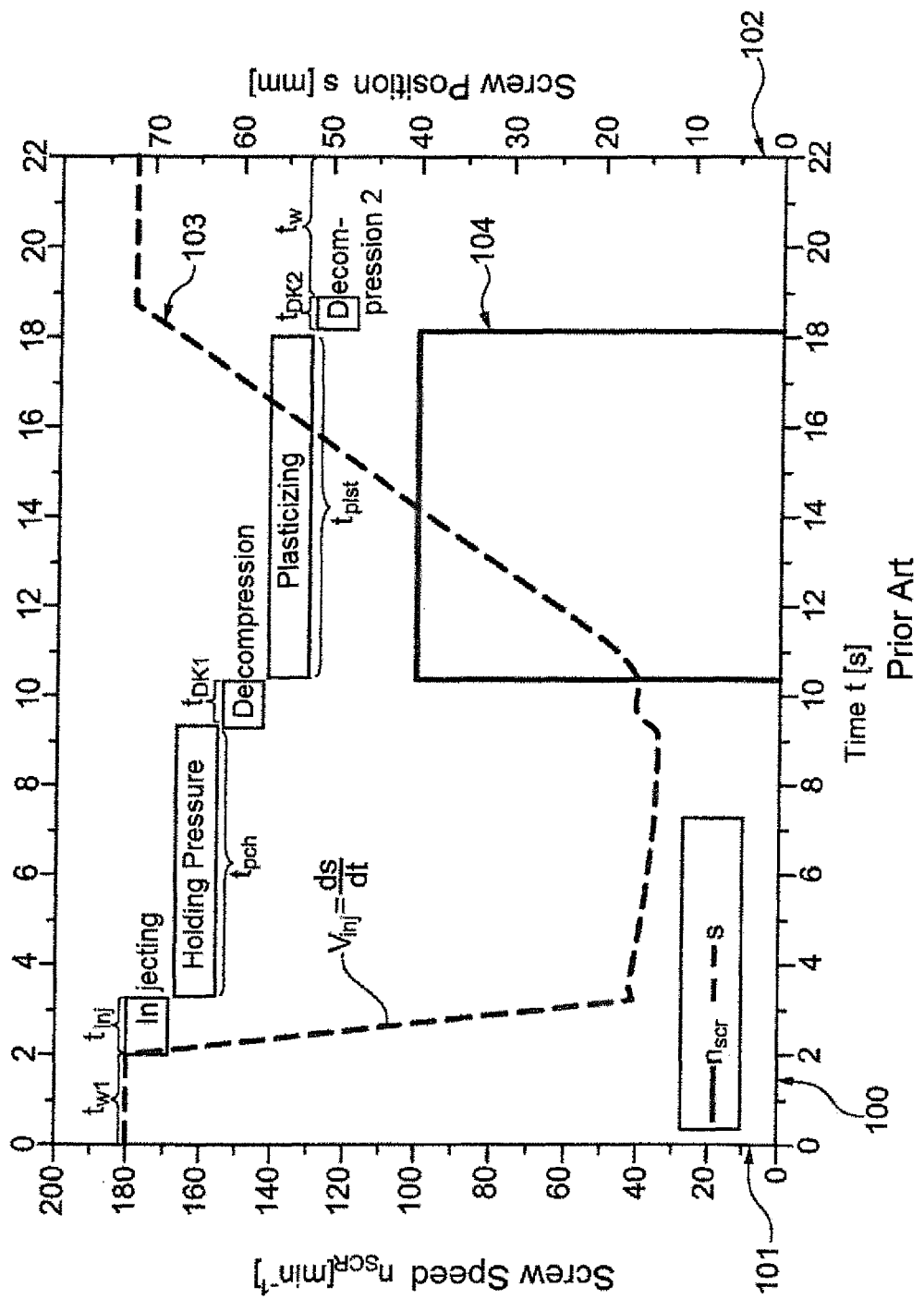
FIG. 3: shows schematically the course of the speed $n_{scr}$ over the time t during an injection cycle of the plasticising screw according to the state of the art.
Figure 4:
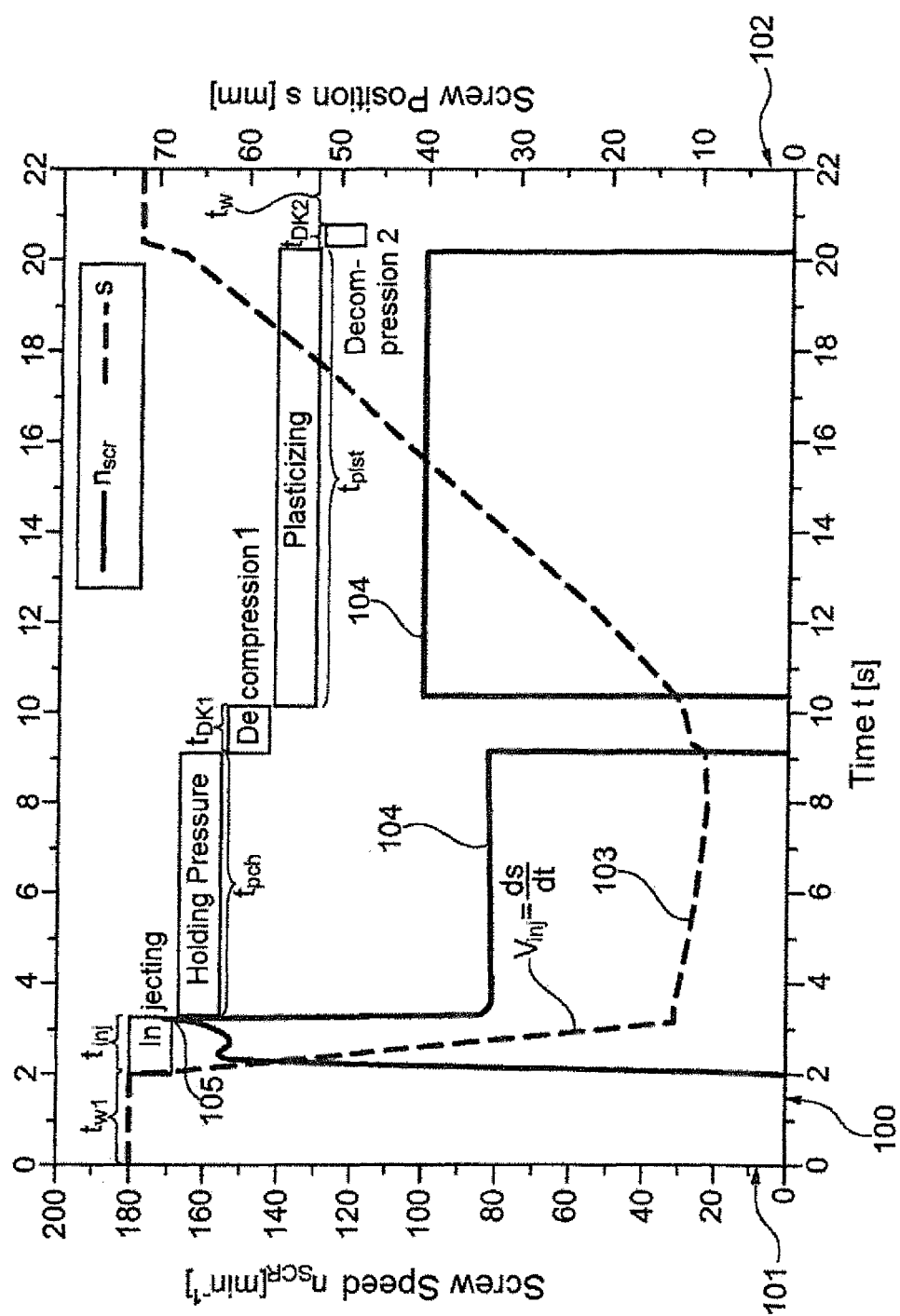
FIG. 4: shows the course of the speed $n_{scr}$ of the plasticising screw for a method according to the invention.
Figure 5:
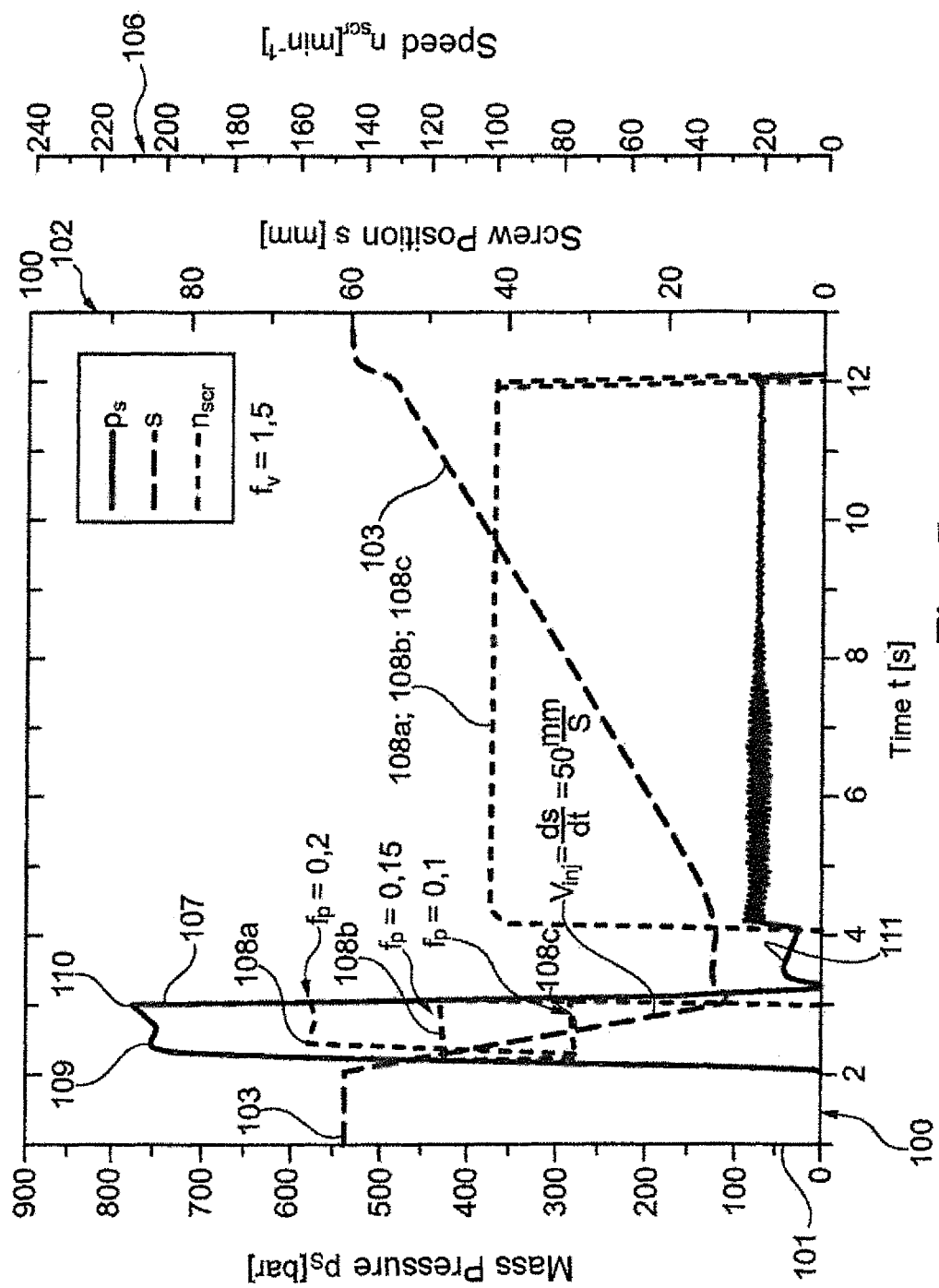
FIG. 5: shows various progressions of the speed $n_{scr}$ of the plasticising screw during the injection phase.
Figure 6:
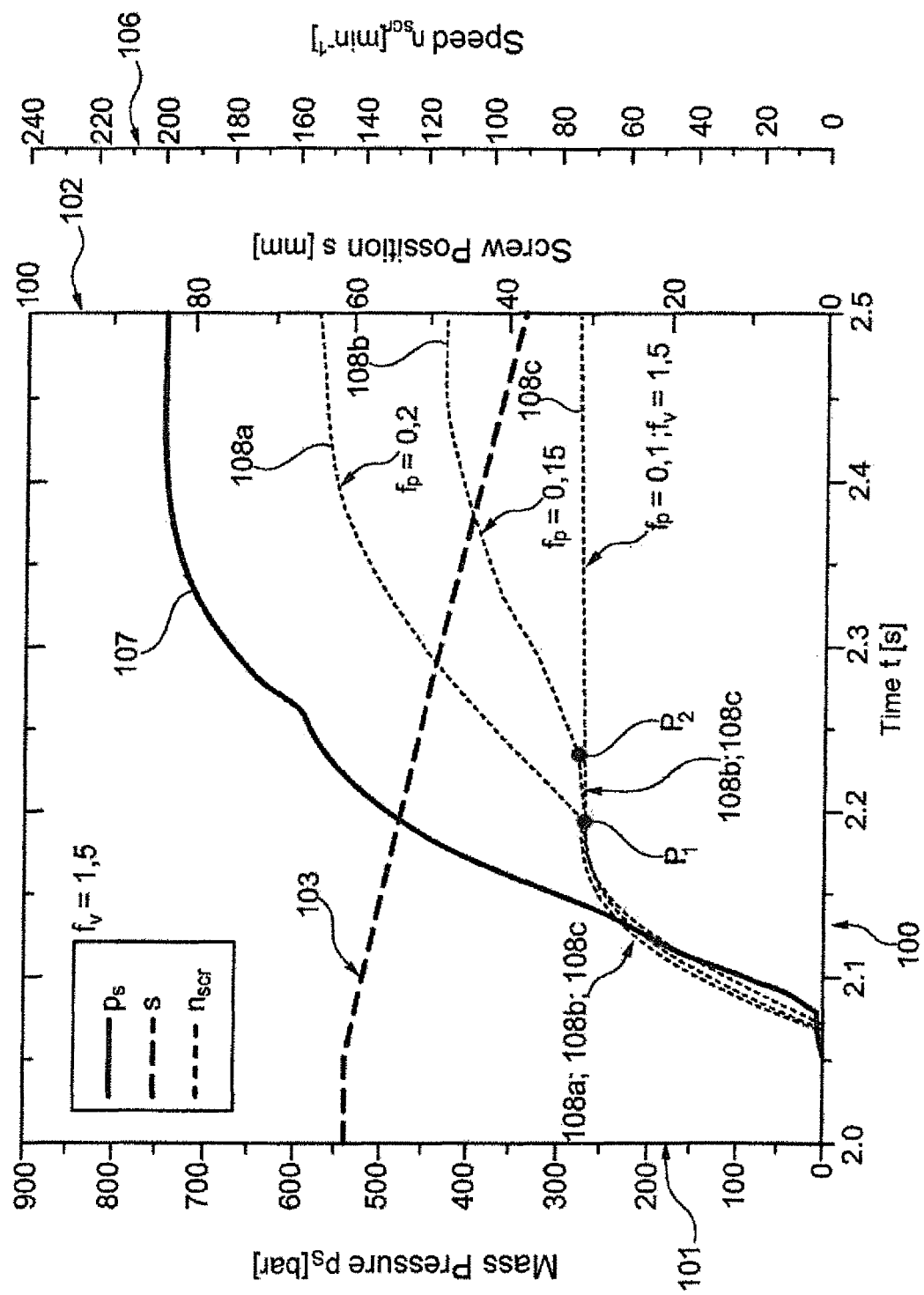
FIG. 6: shows an enlarged cut-out of FIG. 5 for a time period between 2.0 s and 2.5 s of the cycle time.

The method according to the invention will now be explained in more detail by way of example with reference to FIGS. 3 to 6 which represent process diagrams. FIG. 3 shows a process sequence according to the state of the art using a backflow barrier. FIGS. 4 to 6 show process sequences according to the inventive method without the use of a backflow barrier.

In FIG. 3 the abscissa 100 (x-axis) has the time t in seconds plotted on it. The first ordinate 101 (y-axis) has the speed $n_{scr}$ in revolutions per minute (min$^{-1}$) plotted on it. A second ordinate 102 shows the screw position s in millimetres.

The screw position s is shown over the time t as a broken line 103. The speed $n_{scr}$ is depicted as a continuous line 104. At the time t=0 s the speed $n_{scr}$ as well as the translational feed rate $v_{inj}$ of the plasticising screw 3 is zero. At the time t=2 s the injection phase starts, which lasts until time t=3.2 s. The duration of the injection phase is generally denoted with $t_{inj}$. During the injection phase the speed $n_{scr}$ is zero. The plasticising screw 3 is moved at the feed rate $v_{inj}$ from its start position at s=72 mm to its end position at approx. s=15 mm. The translational feed rate $v_{inj}$ corresponds to the rise of the broken line 103 in the time window between t=2 s and t=3.2 s.

During the holding-pressure phase (t=2 s to t=9.2 s) the screw position s drops only marginally. The speed $n_{scr}$ during the holding-pressure phase is zero. The duration of the holding-pressure phase is generally denoted with $t_{pck}$.

Following the holding-pressure phase at approx. t=9.2 s a first decompression phase takes place, in which the screw position s shows again a slight increase. During the first compression phase, which in the process shown in FIG. 3 takes place in the time between approx. t=9.2 s and t=10.2 s, the speed $n_{scr}$ is zero. The duration of the first decompression phase is generally denoted with $t_{DK1}$.

Following the first decompression phase the plasticising phase starts at approx. t=10.2 s, which lasts until approx. t=18.1 s. During the plasticising phase, the duration of which is generally indicated with $t_{plst}$, the melt 14 is conditioned. To condition the melt 14 the plasticising screw 3 during the plasticising phase is rotationally driven at a speed of $n_{scr}$=100 min$^{-1}$. This has the effect of plasticising the raw material and conveying it into the screw antechamber 9 due to the rotation of the plasticising screw 3. At the same time the plasticising screw 3, during the plasticising phase, is returned into a position at approx. s=68 mm. Following the plasticising phase a second decompression phase takes place, in which the plasticising screw 3 is returned to its initial position (s=72 mm). The plasticising screw 3 is thus, in the plasticising phase, returned in one plasticising stroke, and in the second decompression phase is returned in one decompression stroke. During the second decompression phase the speed $n_{scr}$ is zero. The duration of the second decompression phase is generally denoted with $t_{DK2}$.

During the plasticising phase the melt 14 is present in the screw antechamber 9 at a dynamic pressure $p_s$=$p_{stau}$. To reduce the dynamic pressure $p_{stau}$ at the end of the plasticising phase a second decompression phase is provided, during which the dynamic pressure $p_{stau}$ is at least partially reduced while increasing the screw position s.

At the end of the second decompression phase at approx. t=18.8 s the injection moulding machine is again in its initial position. After a waiting time $t_w$, which in the process according to FIG. 3 is somewhat more than 3 seconds (18.8 s≤t≤22 s), the process can again start from the beginning.

With such a classical process sequence according to the state of the art the plasticising screw 3 is driven merely rotationally at a speed $n_{scr}$>0 during the plasticising phase. In the remaining process phases the plasticising screw 3 is at a standstill in rotation direction 6.

Such a process according to the state of the art takes place using a backflow barrier, which for example may be configured as a so-called three-wing backflow barrier.

FIG. 4 shows an exemplary process sequence according to the inventive method. The abscissa 100 shows the cycle time t in seconds. The first ordinate 101 shows the speed $n_{scr}$ in revolutions per minute (min$^{-1}$). The second ordinate 102 shows the screw position s in millimetres. The broken line 103 shows the course of the screw position s over the cycle time t. The continuous line 104 shows, by way of example, the course of the speed $n_{scr}$ in dependence of the cycle time t according to the inventive method.

During a first waiting time $t_{w1}$ from t=0 s to about t=2 s the plasticising screw 3 is in its initial position (s=72 mm). The speed $n_{scr}$ is zero. During the injection phase, i.e. during the time 2 s≤t≤3.2 s, the plasticising screw 3 for injecting the melt 14 is moved in a translational manner into the cavity from its initial position at s=72 mm into an end position at 1 mm. The rise of the broken line 103 in the time window from t=2.0 s to t=3.2 s results in the translational feed speed $v_{inj}$ of the plasticising screw 3 of about $v_{inj}$=50 mm/s.

During the injection phase the translational movement of the plasticising screw 3 commonly takes place in a position-controlled or speed-controlled manner. This means that the injection moulding machine 1 is set up such that the plasticising screw 3 during the injection phase approaches predetermined screw positions s at predetermined process times t in a speed-controlled or position-controlled manner in a translational direction. This movement sequence of the plasticising screw 3 results in a pressure progression $p_s$ of the melt 14 in the screw antechamber 9 during the injection phase. Control of the speed $n_{scr}$ preferably takes place proportionally to the melt pressure $p_s$ with a proportionality factor $k_2$=$f_p$, wherein $$n_{scr}=f_p*p_s.$$

The process includes measuring of the melt pressure $p_s$. The melt pressure $p_s$ may e.g. be measured in the screw antechamber 9 or at another suitable point, for example inside the mould cavity.

Suitable values for the proportionality factor $k_2$=$f_p$ may e.g. be determined in that tests are carried out, during which it is ascertained, at which value for the proportionality factor $k_2$=$f_p$ satisfactory mould fillings, in particular satisfactory component weights, are achieved. A learning process may be used as a reference for a satisfactory component weight or for satisfactory mould fillings, wherein this process may utilise a backflow barrier, constructed for example as a three-wing backflow barrier. Component weights or degrees of mould-filling, which are achievable using a backflow barrier, shall be achieved in the most accurate manner possible by a suitable choice of the proportionality factor $k_2$=$f_p$. It is therefore recommended that during the learning phase a preliminary test is carried out to obtain a product component using a backflow barrier and a field test is carried out without using a backflow barrier for adapting the proportionality factor $k_2$=$f_p$ as optimally as possible.

During the injection phase pressure control of the speed $n_{scr}$ proportionally to the melt pressure $p_s$ has proven its worth. Such pressure control of the speed $n_{scr}$ over the entire duration of the injection phase up to a switch-over point 105 may lead to a delayed build-up of the speed $n_{scr}$ at the beginning of the injection phase, in which the melt pressure $p_s$ is still relatively low, in particular in a range of a few tenths of seconds after commencing injection, because the melt pressure $p_s$ to be measured is still relatively low. In such an initial period of the injection phase it may possibly be convenient, to pre-control the speed $n_{scr}$ in dependence of the translational feed speed $v_{inj}$ of the plasticising screw 3. Such a pre-control in dependence of the translational feed speed $v_{inj}$ can improve component accuracy, since as early as at the beginning of the injection phase, in which admittedly the plasticising screw 3 is already moved translationally, but no significant pressure build-up has as yet occurred, a rotational movement of the plasticising screw 3 already occurs at a speed $n_{scr}$ and thus a certain conveying opposing delivery flow $\dot{m}_{schlepp}$ may be generated, before a significant pressure rise takes place in the screw antechamber 9. This will be explained in more detail further below in connection with FIGS. 5 and 6.

After reaching the switchover point 105 the holding-pressure phase begins, during which the melt pressure $p_s$ is maintained in a pressure-controlled manner at a holding pressure level $p_{s\_pck}$. During the holding-pressure phase, which in the example of FIG. 4 begins at approx. t=3.2 s and which ends at approx. t=9.2 s, the speed $n_{scr}$ is controlled proportionally to the holding pressure $p_{s\_pck}$ at a proportionality factor $k_3 = f_{p\_pck}$ in dependence of the holding pressure $p_{s\_pck}$. In the present embodiment of FIG. 4 the speed $n_{scr}$ during the holding-pressure phase is approx. 80 revolutions per minute ($\min^{-1}$).

As the process continues, the speed $n_{scr}$ is set to zero during the first decompression phase, which in the embodiment of FIG. 4 takes place in the time between t=9.2 s and t=10.2 s. In the first decompression phase the plasticising screw 3 is rotationally at a standstill. During the plasticising phase which follows the first decompression phase and the second decompression phase following the plasticising phase the speed $n_{scr}$ is controlled analogously to the state of the art in the usual manner.

In the example according to FIG. 4 the speed $n_{scr}$ for plasticising the melt 14 during the plasticising phase (10.2 s<t<20.5 s) is set to approx. 100 revolutions per minute. Following the plasticising phase (t>20.5 s), i.e. during the second decompression phase and possibly the following waiting times $t_w$ at the end of the cycle and/or $t_{w1}$ at the beginning of the subsequent cycle, the speed $n_{scr}$ is zero. After the second decompression phase until the beginning of the injection phase of the subsequent cycle the plasticising screw 3 is again in the initial position s=72 mm. The waiting times $t_w$, $t_{w1}$ may possibly result from other processes, which take place during a cycle at an injection machine 1. These operations may for example be moving times for tool halves and/or closing times for mould tools.

FIG. 5 shows various exemplary progressions of the speed $n_{scr}$ during an injection phase according to the method of the invention, wherein the abscissa 100 shows the cycle time t in seconds. The first ordinate 101 shows the melt pressure $p_s$ in bar. The second ordinate 102 shows the screw position s in millimetres. The third ordinate 106 shows the speed $n_{scr}$ in revolutions per minute ($\min^{-1}$).

The melt pressure $p_s$ is shown as a continuous line 107. The progression of the screw position s is shown in form of the broken line.

Three possible exemplary speed progressions of speed $n_{scr}$ are shown in the form of dotted lines 108a, 108b and 108c. The dotted line 108a represents the speed progression of speed $n_{scr}$ for a proportionality factor $f_p=0.2$. The dotted line 108b represents the speed progression of speed $n_{scr}$ for a proportionality factor $f_p=0.15$. The dotted line 108c represents the speed progression of speed $n_{scr}$ for a proportionality factor $f_p=0.1$. The injection moulding cycle shown corresponds to an injection moulding cycle without holding-pressure phase. After a waiting time $t_{w1}$ of approx. 2 s, i.e. at approx. t=2 s, the translational movement of the plasticising screw 3 starts from its initial position at approx. s=60 mm in direction of decreasing screw positions s. At approx. t=3.1 s the screw position s has reached an end position at approx. s=11 mm. At this point in time the injection phase is finished. Then follows a decompression operation. After the decompression operation the plasticising screw 3 remains for a certain amount of time at a plateau of approx. s=13 mm up to the start of the plasticising phase. At approx. t=4.1 s the plasticising phase begins, so that from this time onwards the screw position s increases again. At the end of the plasticising phase, i.e. at t≈12 s the screw position s has reached a value of about s=55 mm. Then follows the second decompression phase, during which the screw position s again reaches its initial position.

The melt pressure $p_s$ (continuous line 107) of approx. t=2 s at the beginning of the injection phase increases very steeply to a first maximum 109, then slightly drops, reaching a second maximum 110 at approx. t=3 s. The second maximum 110 corresponds to the end of the translational forward movement of the plasticising screw 3. At this point in time the forward movement of the plasticising screw 3 is stopped for a change-over to the first decompression phase, which results in a steep drop in pressure of the melt pressure $p_s$. Then follows another slight pressure rise up to a third maximum 111. This pressure rise is due to mechanical vibration processes during the sudden load relief of the plasticising screw 3. At about t=4.1 s the plasticising phase begins, wherein the melt pressure $p_s$ during a settling process in the time from t>4 s to about t=8 s reaches a relatively constant pressure value, which corresponds to the dynamic pressure $p_{stau}$ of the melt 14 during the plasticising phase. At the end of the plasticising phase, at about t=12 s, the melt pressure $p_s$ drops from the level of the dynamic pressure $p_{stau}$ to approx. ambient pressure.

During the plasticising phase the speed $n_{scr}$ the speed is approx. 100 revolution per minute, which corresponds to the plasticising speed $n_{scr\_plst}$.

During the injection phase, that is with regard to the embodiment as per FIG. 5 in the time of approx. t=2.0 s to t=3.1 s, the plasticising screw 3 is driven at a speed $n_{scr}$, which is illustrated in three examples, i.e. by way of dotted lines 108a, 108b and 108c. The dotted line 108a shows the speed progression of the plasticising screw 3 during the injection phase, wherein its speed $n_{scr}=f_p*p_s$ is controlled with a proportionality factor $f_p=k_2=0.2$ in dependence of the melt pressure $p_s$. The dotted line 108b shows the corresponding speed progression of the plasticising screw 3 during the injection phase for a proportionality factor $k_2=f_p=0.15$. The dotted line 108c shows the corresponding speed progression of the speed $n_{scr}$, based on a proportionality factor $k_2=f_p=0.1$. The melt pressure $p_s$ is measured. Using the equation $n_{scr}=f_p*p_s$ the speed $n_{scr}$, which can be set for the plasticising screw 3 via a plasticising drive, is calculated. The speed value for the speed $n_{scr}$ actually achieved at a time t may be somewhat lower than the set value or occur with a time delay, due to inertia and/or friction losses or due to perhaps an intermediate attenuation or a filter such as a signal filter.

In the exemplary embodiment of the inventive method shown in FIG. 5 the speed $n_{scr}$ is set in dependence of the melt pressure $p_s$ during at least the major part of the injection phase. In this way it is possible to overlay the backflow $\dot{m}_{druck}$ by an opposing delivery flow $\dot{m}_{schlepp}$ and thus influence the differential flow $\dot{m}_A$ during the injection phase.

At times, at which still relatively low pressure values of the melt pressure $p_s$ are present and also inertia effects during start-up of the plasticising screw 3 in rotation direction 6 are still very influential, it may be convenient to provide a speed-dependent speed control ahead of the above-described pressure-dependent control of the speed $n_{scr}$. Such a speed-dependent speed control is normally effected using the equation $$n_{scr} = f_v * v_{inj}.$$

Herein $n_{scr}$ is a speed of the plasticising screw 3 to be set. Factor $k_1 = f_v$ is a process-specific proportionality factor. The feed speed $v_{inj}$ is a time-related derivation of the screw position s after the time dt and represents the translational feed speed $v_{inj}$ of the plasticising screw 3 during the injection phase.

In the embodiment according to FIG. 5 the proportionality factor $k_1 = f_v = 1.5$ is chosen by way of example. The translational feed speed $v_{inj}$ in the embodiment of FIG. 5 is 50 mm/s. Once the injection phase has started, the translational feed speed $v_{inj}$ with commonly used injection moulding machines is fully achieved in a very short time, usually even before a significant rise in pressure of the melt pressure $p_s$ takes places. It has proved to be convenient, to control the speed $n_{scr}$ according to the equation $$n_{scr} = f_v * v_{inj}$$

until a value for the speed $n_{scr}$ ascertained in dependence of the pressure according to the equation $n_{scr} = f_p * p_s$ is greater than the value for $n_{scr} = f_v * v_{inj}$ ascertained in dependence of the speed.

In other words this means:

As long as it is true, that the product from the proportionality factor $k_1 = f_v$ and the feed speed $v_{inj}$ of the plasticising screw 3 is greater than the product from the second proportionality factor $k_2 = f_p$ and the measured melt pressure $p_s$, the speed $n_{scr}$ is determined and set according to the equation $n_{scr} = f_v * v_{inj}$. As soon as the product from the second proportionality factor $k_2 = f_p$ and the measured melt pressure $p_s$ is greater than the product from the first proportionality factor $k_1 = f_v$ and the translational feed speed $v_{inj}$ the speed feed $n_{scr}$ of the plasticising screw 3 is determined and set according to the equation $$n_{scr} = f_p * p_s.$$

Thus initially, i.e. for relatively low pressure values of the melt pressure $p_s$, a speed-dependent control of the speed $n_{scr}$ is effected in dependence of the translational feed speed $v_{inj}$ of the plasticising screw 3. For higher pressures values of the melt pressure $p_s$ the speed $n_{scr}$ is controlled pressure-dependent as a function of the melt pressure $p_s$.

Given the case that at no time during the injection moulding cycle the term $f_p * p_s$ is greater than the term $f_v * v_{inj}$, there will be no switch-over from the speed-controlled speed $n_{scr}$ to the pressure-controlled speed $n_{scr}$ of the plasticising screw. The speed $n_{scr}$ in this case is determined and set exclusively speed-controlled as a function of the translational feed speed $v_{inj}$.

If the speed $n_{scr}$ of the plasticising screw 3 is determined and set during the injection phase and/or during the holding-pressure phase according to the equation $$n_{scr} = f_p * p_s$$

then:

$n_{scr}$: is the speed of the plasticising screw 3 in revolutions per minute (min$^{-1}$),
$f_p$: is the proportionality factor in units of min$^{-1}$/bar,
$p_s$: is the melt pressure in bar.

The melt pressure $p_s$ is measured, for example, in the screw antechamber 9 or at another point of the injection moulding machine 1, at which a pressure representing the melt pressure $p_s$ can be measured. A suitable value for the proportionality factor $k_2 = f_p$ is ascertained process-specifically by way of a preliminary test. To this end at least one product component is produced in a learning phase with the aid of a backflow barrier. This product component in particular is used as a reference component with regard to its component weight. After obtaining the reference component part the backflow barrier is removed from the plasticising unit. The injection moulding cycle is repeated without the use of a backflow barrier for different values for $f_p$. For each value $f_p$ at least one comparison component is generated, wherein the comparison component is compared to the at least one reference component with regard to its component weight. Using this procedure a value for the proportionality factor $f_p$ can be iteratively determined, wherein it is ensured that the test component corresponds to the product component within a tolerable tolerance range. When a suitable value for the factor $f_p$ has been found, the method according to the invention can be carried out in a production phase with the thus determined value for $f_p$ without the use of a backflow barrier.

If the speed $n_{scr}$ is determined and set in dependence of the translational feed speed $v_{inj}$ of the plasticising screw 3 with $$n_{scr} = f_v * v_{inj},$$

then:

$n_{scr}$: is the speed of the plasticising screw 3 in revolutions/min (min$^{-1}$),
$f_v$: is the proportionality factor with the unit $$\frac{\text{min}^{-1}}{\frac{\text{mm}}{\text{s}}},$$

$v_{inj}$: is the translational feed speed of the plasticising screw 3 in mm/s.

The size of the proportionality factor $f_v$ is determined by proceeding in an analogous manner to the determination of the size of the proportionality factor $f_p$. To this end at least one product component, preferably a number of product components, are initially produced as part of a learning phase in a preliminary test using a backflow barrier. Once the product components have been produced the backflow barrier is removed. Subsequently, without using a backflow barrier, a plurality of test components is generated employing different factors $f_v$, each of which are compared to the product components, in particular as regards their component weight. If a test component lies within its tolerable tolerance field, e.g. as regards its component weight in comparison to the product component, the proportionality factor $k_1 = f_v$ used with the corresponding test component is used. Thus the proportionality factor $f_v$ is iteratively determined in a learning phase ahead of the production phase. Using a suitable value for the proportionality factor $k_1 = f_v$ determined during the learning phase, the corresponding component can then be produced following the learning phase without the use of a backflow barrier, wherein at least during a part of the injection phase the speed $n_{scr}$ is determined and set from the translational feed speed $v_{inj}$ and the determined value for the proportionality factor $k_1 = f_v$. In this case the speed control of speed $n_{scr}$ at least during the injection phase is effected in a speed-controlled manner as a function of the translational feed speed $v_{inj}$ of the plasticising screw 3.

It has proven to be particularly advantageous, at least during the injection phase, to control the speed $n_{scr}$ in a speed-controlled manner in an initial period of the injection phase and to control it in a pressure-controlled manner in the remaining injection phase following on from the initial period of the injection phase. This has the advantage that at a time in which there is not as yet a noticeable melt pressure $p_s$ but in which the plasticising screw 3 is already feeding forward with a feed speed of $v_{inj}>0$ mm/s, it is possible to adapt the speed $n_{scr}$ of the plasticising screw 3 in the initial period. With this approach the procedure is conveniently as follows:

1. The melt pressure $p_s$ is measured throughout the injection phase.
2. The feed speed $v_{inj}$ of the plasticising screw 3 in translational direction is either measured or calculated from the momentary machine data such as a change in the screw position $\Delta s$ per time unit $\Delta t$.
3. As long as the product of the proportionality factor $f_v$ and the feed speed $v_{inj}$ is greater than the product of the proportionality factor $f_p$ and the melt pressure $p_s$, the speed $n_{scr}$ is determined and set according to the equation $$n_{scr}=f_v*v_{inj}.$$

As from a time $t_1$, where $$f_p*p_s>f_v*v_{inj}$$

the speed $n_{scr}$ is determined and set according to the equation $$n_{scr}=f_p*p_s.$$

Viewed over the entire injection phase, the control of the speed $n_{scr}$ is initially carried out as a function of the speed and as from a certain point in time $t_1$, the control of the speed $n_{scr}$ is carried out as a function of the pressure.

Tests have shown that with such a speed-dependent as well pressure-dependent control of the speed $n_{scr}$, particularly good results can be achieved. The reason for this is that in an initial period of the injection phase in which there is as yet no noticeable melt pressure $p_s$, but where the feed speed $v_{inj}$ already exists, the plasticising screw is impacted early with a speed $n_{scr}$ for compensating for the backflow $\dot{m}_{druck}$, which has a positive effect on component quality.

Suitable values for the proportionality factors $k_1=f_v$ and $k_2=f_p$ are determined by proceeding iteratively, as previously described. To this end, as already described, at least one product component is produced with the aid of a backflow barrier.

By means of a field test using different values for the proportionality factor $k_1=f_v$ and the proportionality factor $k_2=f_p$ an optimal value pair for the factors $f_p$ and $f_v$ can be iteratively determined. With such a value pair determined in this way for the factors $f_v$ and $f_p$ the inventive method for operating an injection moulding machine 1 may be performed in a production phase without using a backflow barrier.

During the holding-pressure phase it has conveniently proven to determine the speed $n_{scr}$ according to the equation $$n_{scr}=f_{p\_pck}*p_{s\_pck}.$$

wherein:

$n_{scr}$: is the speed $n_{scr}$ of the plasticising screw 3 to be set or controlled during the holding-pressure phase;

$f_{p\_pck}$: is a proportionality factor $k_3=f_{p\_pck}$ during the holding-pressure phase. This factor has the unit min$^{-1}$/bar, and $p_{s\_pck}$: is a melt pressure of the melt 14 during the holding-pressure phase (holding pressure).

A suitable value for the proportionality factor $k_3=f_{p\_pck}$ can be determined by iteratively determining a suitable value for the factor $k_3=f_{p\_pck}$ in a learning phase analogously to the determination of the factors $f_p$ and $f_v$. To this end test components are produced in a field experiment using different values for the factor $k_3=f_{p\_pck}$ and compared to one or more product components, which were produced using a backflow barrier. If a test component manufactured using a certain factor $k_3=f_{p\_pck}$ ties within a tolerance band about the product component, for example as regards the component weight, the factor $k_3=f_{p\_pck}$ used for the respective test component can be used for the production phase for manufacturing the component according to the inventive method without using a backflow barrier.

An alternative method for determining the values for the proportionality factors $k_1=f_v$, $k_2=f_p$ and $k_3=f_{p\_pck}$ is based on the use of the output factor AF. The output factor AF is a value empirically determined and known for a certain moulding compound. The output factor is defined as:

$$AF = \frac{m}{V_{str}};$$

with:

AF: output factor in the unit g/cm$^3$,
m: moulding compound in the unit g and
$V_{str}$: stroke volume in cm$^3$ of melt 14 displaced by the plasticising screw 3.

The output factor AF takes into account a volume change of the moulding compound during the transition of melt 14 into a solid body as well as a closing behaviour of a well-functioning backflow barrier.

In the table 1 below the output factor AF is cited for popular moulding compounds.

| Moulding compound: | Output factor AF: |
|---|---|
| PP | 0.72 |
| HDPE | 0.73 |
| LDPE | 0.70 |
| PC | 0.98 |
| ABS | 0.88 |
| PS | 0.91 |
| PA | 0.91 |
| PA6 | 0.93 |
| PA66 | 1.15 |
| POM | 1.10 |
| PMMA | 0.94 |
| PC/PBT | 1.04 |

For the purpose of determining the proportionality factors $k_1=f_v$, $k_2=f_p$ and/or $k_3=f_{p\_pck}$ it is simply assumed, that the output factor $AF_{inv}$ achieved by the inventive method is to be equal to a known output factor AF of a certain moulding compound. If this is the case, it can be assumed that using the selected factors $k_1=f_v$, $k_2=f_p$ and/or $k_3=f_{p\_pck}$ and the speeds $n_{scr}$ resulting therefrom during the injection and/or holding-pressure phase the effect of a backflow barrier is achieved by influencing the speed $n_{scr}$ during the mould filling operation, even if, as provided by the inventive method, no backflow barrier is used.

Next, with reference to FIG. 6, a transition of the control of the speed $n_{scr}$ from a speed $n_{scr}$ controlled in a speed-dependent manner to a speed $n_{scr}$ controlled in a pressure-dependent manner will be discussed.

On the abscissa 100 FIG. 6 shows a short time section of a moulding injection cycle at the beginning of the injection phase in a time window from t=2.0 s to t=2.5 s. On the first ordinate 101 the melt pressure $p_s$ in shown in bar. On the second ordinate 102 the screw position s is shown in mm. On the third ordinate 106 the speed $n_{scr}$ is shown in revolutions/minute (min$^{-1}$). The progression of the melt pressure $p_s$ over the time t is shown in the form of a continuous line 107. The screw position s is shown in form of the broken line 103. The speed $n_{scr}$ is shown in form of dotted lines 108a, 108b and 108c for different proportionality factors $f_v$ and $f_p$.

At the time t=2.0 s the screw position s is approx. 60 mm. This corresponds to the initial position of the plasticising screw 3 prior to the start of the injection phase. As from the time t≥2.5 s the screw position s decreases continually at a constant gradient down to a screw position s=38 mm at a time t=2.5 s. The gradient of the broken line 103 is constant and corresponds to the translational feed speed of $v_{inj}$=50 mm/s. At a delay relative to the movement of the plasticising screw 3 the melt pressure $p_s$ begins to rise at a time of t=2.8 s. The time-related delay between the start of the translational screw movement and a rise in pressure of the melt pressure $p_s$ occurs because the plasticising screw 3, starting from its initial position, must overcome a certain distance until it comes into contact with the melt 14 and only then causes a rise in pressure in the melt 14. In the embodiment of FIG. 6 the melt pressure $p_s$ rises over time and at t=2.5 s reaches a plateau at approx. $p_s$=750 bar.

Speed control of the speed $n_{scr}$ is shown in the embodiment of FIG. 6 for a first proportionality factor $k_1$=$f_v$=1.5 as well as for three different second proportionality factors $k_2$=$f_p$=0.1, $k_2$=$f_p$=0.15 and $k_2$=$f_p$=0.2.

At the start of the injection phase the dotted lines 108a, 108b, 108c for the speed $n_{scr}$ are congruent or almost congruent. In this region, which covers a time span from about t=2.05 s to t=2.2 s, the speed $n_{scr}$ is controlled as a function of the feed speed $v_{inj}$. As from a point $P_1$, which in the embodiment of FIG. 6 is at about t=2.2 s, the product from the proportionality factor $f_p$=0.2 and the melt pressure $p_s$ exceeds the product from the proportionality factor $f_v$=1.5 and the translational feed speed $v_{inj}$, so that in terms of time after the point $P_1$ the speed $n_{scr}$ (dotted line 108a) is pressure-controlled. For the speed progression $n_{scr}$ as per the dotted line 108a, point $P_1$ represents the switch-over point from a speed-dependent control of the speed $n_{scr}$ to a pressure-dependent control of the speed $n_{scr}$.

A second switch-over point $P_2$ is arranged at a later point in time, at about t=2.24 s. From this switch-over point $P_2$ onwards the speed $n_{scr}$ for an exemplary proportionality factor of $f_p$=0.15 is determined and set in a pressure-controlled manner. During the initial period of the injection phase up to the switch-over point P2 speed control for the example $f_p$=0.15 is in a speed-controlled manner using the proportionality factor $f_v$=1.5.

The dotted line 108c in the embodiment of FIG. 6 shows the case of the speed $n_{scr}$ being controlled exclusively in a speed-dependent manner, since at no point in the cut-out of the injection phase shown in FIG. 6 the melt pressure $p_s$ is high enough for a switch-over to be made from the speed-dependent control of the speed to a pressure-dependent control of the speed.

Figure 7:
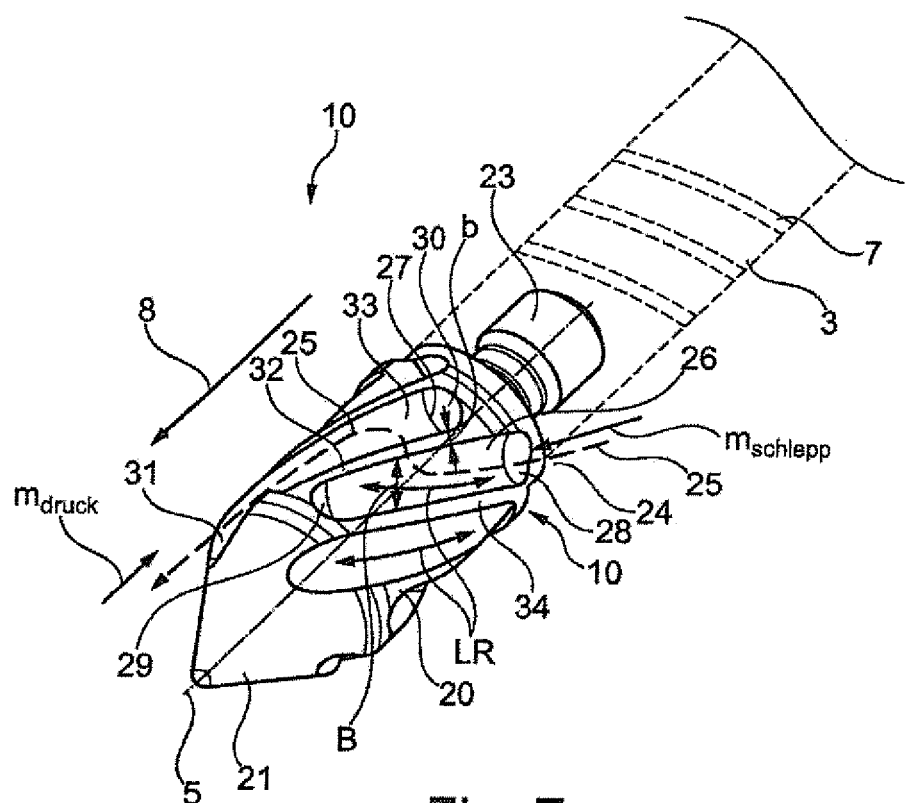
FIG. 7: shows a screw head in a first embodiment, which is suitable for performing the method according to the invention.

A first embodiment of a screw head 10 for use in the inventive method will now be explained in detail with reference to FIG. 7. The screw head 10, in particular for performing the inventive method, comprises a screw body 20 and a screw tip 21. Opposite the screw tip 21 the screw head 10 comprises a connection region 23, by means of which the screw head 10 can be non-rotatably connected to the plasticising screw 3 relative to the longitudinal axis 5. The screw body 20 comprises at least one radially externally open flow channel 24. Through this flow channel 24 the melt 14 leaving the screw threads 7 of the plasticising screw 3 can get along a flow path 25 into an area in front of the screw tip 21 (screw antechamber 9).

To this end the flow channel 24 is formed of adjacently extending blind grooves 26, 27 which helically overlap at least partially in their longitudinal direction LR, wherein a first blind groove 26 is open for the entry of melt at an upstream end 28 with respect to the conveying direction and which is closed for the discharge of melt at a downstream end 29. A second blind groove 27 is closed for melt entry at an upstream end 30 and open for melt discharge at its downstream end 31. The blind grooves 26, 27, in the region where they overlap in longitudinal direction LR, are separated from each other by a shear web 32, wherein the shear web 32, in its height, in particular measured relative to a groove bottom 33 of the blind grooves 26, 27, is dimensioned such that a shear gap is formed to a plasticising cylinder 2 (see FIG. 1; 2) surrounding the screw head 10. This allows the melt 14 to flow from the first blind groove 26 over the shear web 32 into the blind groove 27. Melt 14 thus enters the first blind groove 16 along the flow path 25 depicted as a broken line, flows over the shear web 32 and through the second blind groove 27, at the open end of which the melt 14 can leave the screw head 10.

A blind groove pair 26, 27 forming the flow path 25 is separated from an adjacent blind groove pair by a barrier web 34. The barrier web 34, with regard to its height, is dimensioned such that the barrier web 34 is constructed higher relative to the shear web 32. In particular, the barrier web 34 forms the outer diameter of the screw body 20 and is thus the determining factor for a radial screw play of the screw head 10 within the plasticising cylinder 2 (not shown in FIG. 7).

The blind grooves 26, 27 in particular comprise a pitch of t/E of more than 1.5, in particular more than 2.0. "t" is a radial length, which an imaginary helical blind groove would take up along the plasticising screw 3/the screw body 20.

D is the outer diameter of the screw body 20/the screw diameter of the plasticising screw 3. In the depicted embodiments of the screw head as per FIGS. 3 to 6 the blind grooves 26, 27 are however not configured as complete thread spirals but have a longitudinal extension which is distinctly less than a complete pitch.

A shear gap width, i.e. a clear span between the barrier web 32 and the surrounding cylinder wall of the plasticising cylinder 2 (not shown in FIG. 7) is preferably at least twice that of the radial screw play of the screw body 20 to the plasticising cylinder 2. A web width b of the shear web 32 is at least 0.2 times that of a groove width B of a blind groove 26, 27 and preferably at most 0.4 times that of the groove width B of the blind groove 26, 27. In practice the web width b lies e.g. in the range between 3 mm and 10 mm.

Figure 8:
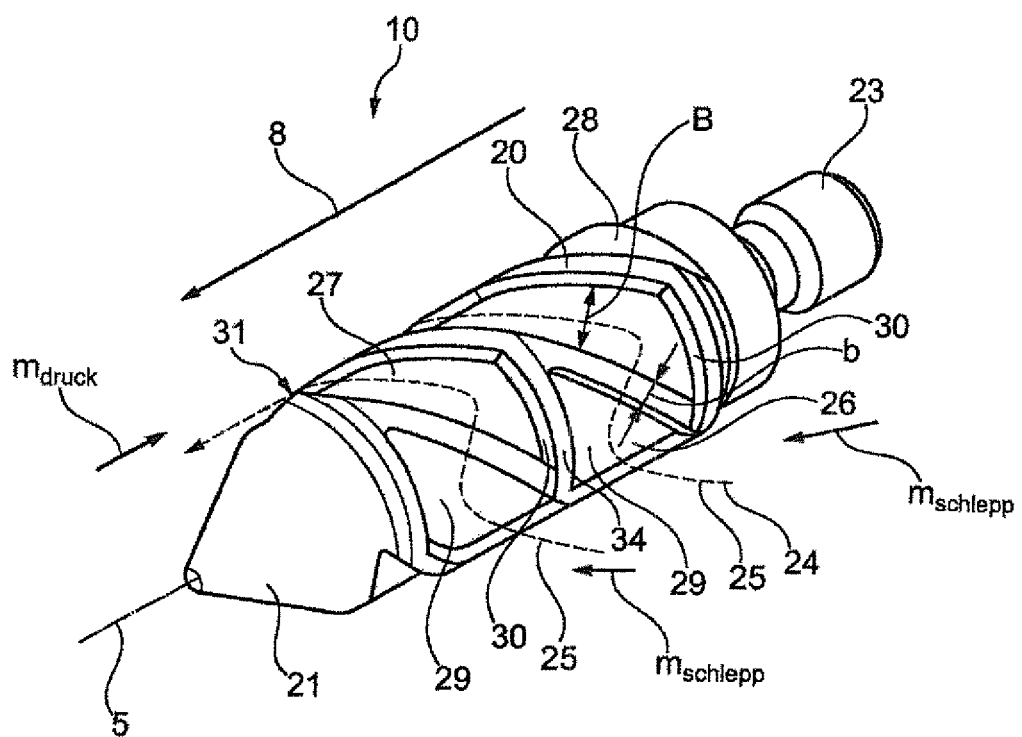
FIG. 8: shows a screw head in a second embodiment, which is suitable for performing the method according to the invention.

In a further embodiment as per FIG. 8 the screw head 10 is configured in the manner of a double-acting coil part with two blind groove pairs arranged offset to one another in the manner of a two-thread screw. With this embodiment the blind grooves 26, 27 of a blind groove pair are configured with different lengths with regard to their longitudinal direction along the conveying direction 8. The flow path 25 is schematically depicted with broken lines similar to FIG. 3. In longitudinal direction the first blind groove 26 of a blind groove pair is separated from the second blind groove 27 of a second blind groove pair by a barrier web 34 extending essentially in circumferential direction.

Figure 9:
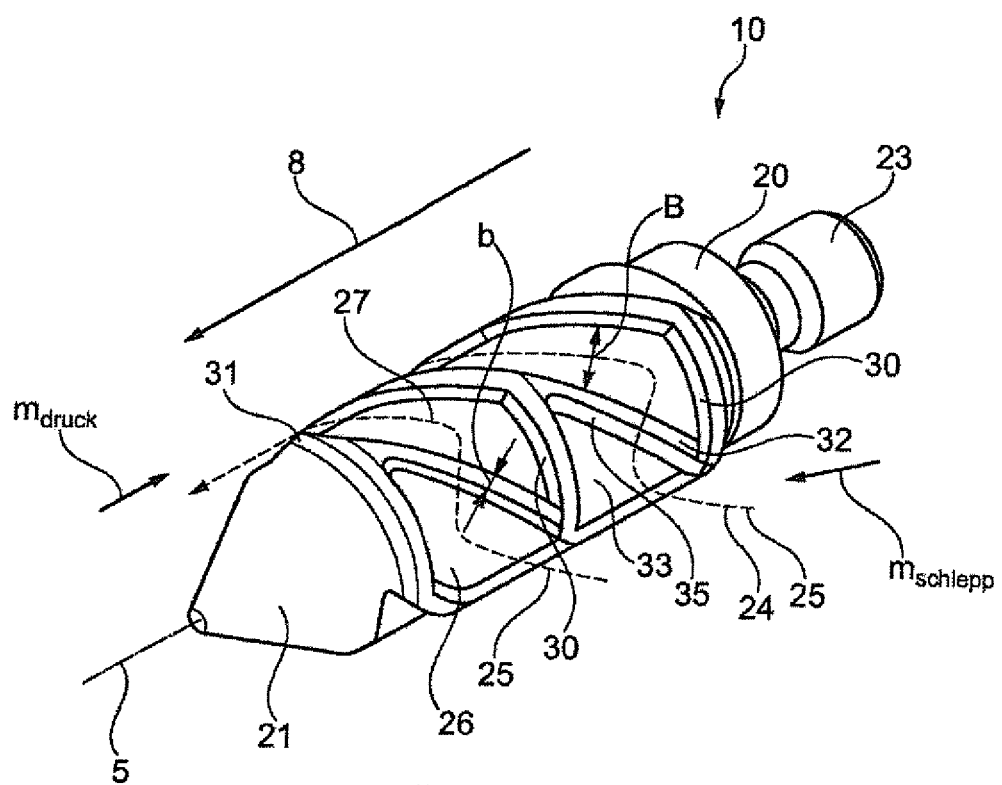
FIG. 9: shows a screw head in a third embodiment, which is suitable for performing the method according to the invention.

A further development of a screw head 10 as per FIG. 8 is shown in FIG. 9. The screw head 10 as per FIG. 5 is different in that sides 35 of the barrier webs 32 which point against the flow path 25, comprise a chamfer the chamfer angle of which is e.g. <20° relative to an imaginary non-chamfered side 35. In a special embodiment as per FIG. 9 the sides 35 are chamfered in such a way (bevelled), that the chamfer reaches almost to the groove bottom 33. In other respects the screw head 10 of FIG. 9 corresponds to the design of the screw head 10 as FIG. 8. Due to the chamfered sides 35 in the above described sense the flow-over of the shear web 32 along the flow path 35 can be positively influenced.

Figure 10:
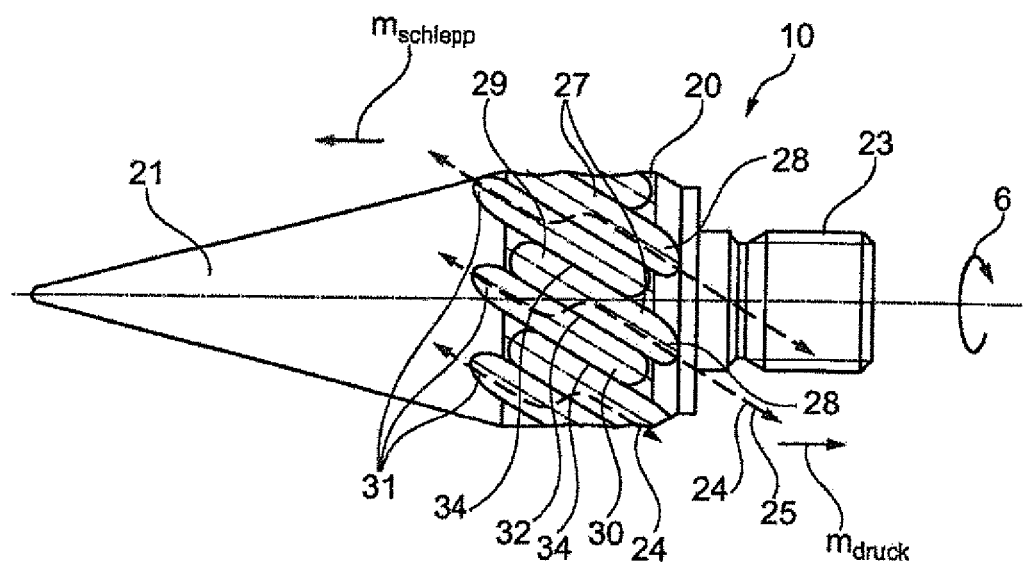
FIG. 10: shows a screw head in a fourth embodiment, which is suitable for performing the method according to the invention.

A fourth embodiment of the screw head 10 as per FIG. 10 is characterised in that an axial length of the screw tip 21 is greater than an axial length of the screw body 20, which comprises the blind grooves 26, 27. All screw heads 10 as per FIGS. 7 to 10 are so-called conveying-efficient screw heads 10 which for a rotational drive in rotational direction 6 have the characteristic of conveying melt material in conveying direction 8. The use of such a screw head 10 is particularly meaningful for the method according to the invention because there is no need for/there does not exist a backflow barrier which would prevent a backflow of the melt current over and beyond the screw head 10.

The invention claimed is:

1. A method for operating an injection moulding machine, said method being executed in the absence of a backflow barrier and comprising:
   injecting plastic melt by a plasticising device into a mould cavity from a screw antechamber of a plasticising screw by both rotating the plasticising screw about a longitudinal axis and moving the plasticising screw translationally both during an injection phase and during a holding-pressure phase;
   controlling a rotational drive of a drive unit such that a rotation speed of the plasticising screw causes overlay of a backflow of the plastic melt from the screw antechamber back into screw threads of the plasticising screw caused by the translational injection movement of the plasticising screw is superimposed by an opposing delivery flow as a result of the rotation of the plasticising screw, thereby establishing a differential flow from the backflow and the opposing delivery flow; and influencing the differential flow at least during the injection phase by influencing the speed of the plasticising screw.

2. The method of claim 1, wherein the differential flow is $\dot{M}_\Delta > 0$, which is equivalent to the opposing delivery flow being greater than the backflow.

3. The method of claim 1, wherein the differential flow is $\dot{m}_A = 0$, which is equivalent to the backflow being of same size as the opposing delivery flow.

4. The method of claim 1, wherein the differential flow is $\dot{M}_\Delta < 0$, which is equivalent to the backflow being greater than the opposing delivery flow.

5. The method of claim 1, further comprising determining and controlling the speed of the plasticizing screw in dependence of at least one melt parameter, or adaptively adjusting the speed during the injection phase and/or during the holding-pressure phase of a single cycle to at least one melt parameter.

6. The method of claim 5, wherein the melt parameter is a parameter selected from the group consisting of a melt pressure of the plastic melt in the screw antechamber, a melt pressure of the plastic melt inside the mould cavity, a melt viscosity of the plastic melt, a melt temperature of the plastic melt, a plasticising torque, a torque of the plasticising screw during the injection and holding-pressure phase, and any combination thereof.

7. The method of claim 1, wherein the backflow, the opposing delivery flow and the differential flow resulting therefrom are mass flows or volume flows of the plastic melt.

8. The method of claim 1, further comprising influencing a translational stroke of the plasticising screw at least during the injection phase in dependence of an absolute size of the differential flow, such that
   the translational stroke of the plasticising screw is lengthened in relation to a theoretical zero position, when the differential flow is $\dot{m}_A < 0$, or
   the translational stroke of the plasticising screw is shortened in relation to a theoretical zero position, when the differential flow is $\dot{m}_A > 0$.

9. The method of claim 1, configured for implementation throughout an entire injection phase and/or during an entire holding-pressure phase.

10. The method of claim 1, further comprising varying the speed of the plasticising screw over the time to influence the differential flow, in particular to keep the differential flow constant during the injection phase and/or during the holding-pressure phase of one and the same injection moulding cycle.

11. The method of claim 1, further comprising predefining the speed proportionally to a feed speed of the plasticising screw in a translational direction or proportionally to a melt pressure of the plastic melt, measured in particular in the screw antechamber or behind a screw shaft.

12. The method of claim 1, further comprising:
   pre-controlling the speed of the plasticizing screw at a start of the injection phase with a proportionality factor $k_1 = f_v$ in dependence of the feed speed in accordance with $n_{scr} = v_{inj} * k_1$, wherein $n_{scr}$ is the speed, $v_{inj}$ is the feed speed, until the plasticising screw contacts the plastic melt, so that a melt pressure rises;
   setting the speed with a proportionality factor $k_2 = f_p$ via a product $n_{scr} = p_s * k_2$, when the product $n_{scr} = p_s * k_2$ is greater than a product $n_{scr} = v_{inj} * k_1$, wherein $p_s$ is the melt pressure; and
   setting the speed in the holding-pressure phase with a proportionality factor $k_3 = f_{p\_pck}$ via a product $n_{scr} = k_3 * p_{s\_pck}$, wherein $p_{s\_pck}$ is the melt pressure in the holding-pressure phase.

13. The method of claim 1, wherein the speed of the plasticizing screw during the injection phase and during the holding-pressure phase is predefined as an adjustable profile.

14. The method of claim 1, further comprising generating during the holding-pressure phase a holding pressure of the plastic melt at least partially via the rotation of the plasticising screw.

15. The method of claim 1, further comprising increasing the speed of the plasticizing screw for a predefined screw diameter for increasing an output factor and thus a shot weight.

16. The method of claim 1, further comprising regulating or controlling the speed of the plasticising screw component-specifically for adjusting an optimal flow front speed of the plastic melt within the mould cavity.

17. The method of claim 1, further comprising:
determining the speed of the plasticising screw at least during a part of the injection phase;
setting the speed of the plasticising screw proportionally to a melt pressure with the factor $k_2=f_p$ in accordance with the equation:

$$n_{scr}=f_p*p_s,$$

wherein $p_s$ is the melt pressure and $n_{scr}$ is the speed of the plasticizing screw; and
measuring the melt pressure, with $k_2=f_p$ being a proportionality factor determined in a process-specific manner.

18. The method of claim 1, further comprising:
determining the speed of the plasticising screw at least during a part of the injection phase;
setting the speed proportionally to the feed speed with the factor $k_1=f_v$ in accordance with the equation:

$$n_{scr}=f_v*v_{inj},$$

wherein $v_{inj}$ is the feed speed and $n_{scr}$ is the speed of the plasticizing screw; and
measuring the feed speed or determining the feed speed from process data, with $k_1=f_v$ being a proportionality factor determined in a process-specific manner.

19. The method of claim 1, further comprising:
determining the speed of the plasticising screw at least during a part of the holding-pressure phase;
setting the speed proportionally to the melt pressure in the holding-pressure phase with the factor $k_3=f_{p\_pck}$ in accordance with the equation:

$$n_{scr}=f_{p\_pck}*p_{s\_pck},$$

wherein $p_{s\_pck}$ is the melt pressure in the holding-pressure phase and $n_{scr}$ is the speed of the plasticizing screw; and
measuring the melt pressure in the holding-pressure phase, with $k_3=f_{p\_pck}$ being a proportionality factor determined in a process-specific manner.

20. The method of claim 1, further comprising:
determining and setting the speed of the plasticizing screw in the injection phase using the equation:

$$n_{scr}=f_v*v_{inj}$$

wherein $n_{scr}$ is the speed of the plasticizing screw and $v_{inj}$ is the feed speed, when:

$$f_v*v_{inj}>f_p*p_s$$

wherein $p_s$ is the melt pressure; and/or
determining and setting the speed of the plasticizing screw in the injection phase using the equation:

$$n_{scr}=f_p*p_s$$

when:

$$f_v*v_{inj}<f_p*p_s.$$

21. The method of claim 12, further comprising determining the proportionality factors $k_1=f_v$ and/or $k_2=f_p$ and/or $k_3=f_{p\_pck}$ in a process-specific manner in a learning phase.

* * * * *